US008386160B2

(12) United States Patent
Tsunekawa et al.

(10) Patent No.: US 8,386,160 B2
(45) Date of Patent: Feb. 26, 2013

(54) BODY DETECTION APPARATUS, AND BODY DETECTION METHOD

(75) Inventors: Jun Tsunekawa, Nagoya (JP); Masayuki Kishida, Kobe (JP)

(73) Assignees: Toyota Jidosha Kabushiki Kaisha, Toyota-shi (JP); Fujitsu Ten Limited, Kobe-shi (JP)

( * ) Notice: Subject to any disclaimer, the term of this patent is extended or adjusted under 35 U.S.C. 154(b) by 626 days.

(21) Appl. No.: 12/612,933

(22) Filed: Nov. 5, 2009

(65) Prior Publication Data

US 2010/0169015 A1 Jul. 1, 2010

(30) Foreign Application Priority Data

Dec. 26, 2008 (JP) ................................ 2008-333758

(51) Int. Cl.
*G06F 17/10* (2006.01)

(52) U.S. Cl. ........... 701/301; 342/70; 342/455; 348/169

(58) Field of Classification Search .................. 701/301, 701/300, 93, 94, 96, 97, 33.4; 342/70, 455; 348/169, E7.086; 340/435, 902, 903, 436, 340/937

See application file for complete search history.

(56) References Cited

U.S. PATENT DOCUMENTS

2007/0222566 A1 * 9/2007 Tsuji et al. .................... 340/435

FOREIGN PATENT DOCUMENTS

| | | |
|---|---|---|
| JP | 8-160132 | 6/1996 |
| JP | 11-352229 | 12/1999 |
| JP | 2000-206241 | 7/2000 |
| JP | 2001-51050 | 2/2001 |
| JP | 2003-057339 | 2/2003 |
| JP | 2003-215244 | 7/2003 |
| JP | 2008-267826 | 11/2008 |
| JP | 2008-302904 | 12/2008 |

OTHER PUBLICATIONS

Office Action issued Nov. 2, 2010, in Japanese Patent Application No. 2008-333758, filed Dec. 26, 2008 (with English language translation).

* cited by examiner

*Primary Examiner* — Thomas Black
*Assistant Examiner* — Luke Huynh
(74) *Attorney, Agent, or Firm* — Oblon, Spivak, McClelland, Maier & Neustadt, L.L.P.

(57) ABSTRACT

A body detection apparatus includes: movement direction calculation portion that calculates a movement direction of each of acquisition points by using signals that show the acquisition points and that are obtained through detection of a body present around the vehicle; and determination portion that pre-sets a frame commensurate with a shape of a body as a detection object, and for pre-setting for the frame a reference traveling direction as an assumed traveling direction of the body, and for determining, among the acquisition points, acquisition points present within the frame whose reference traveling direction is aligned with the movement direction as being acquisition points of a single body.

15 Claims, 15 Drawing Sheets

COMPARATIVE EXAMPLE

COMPARATIVE EXAMPLE

COMPARATIVE EXAMPLE

BODY DETECTION APPARATUS, AND BODY DETECTION METHOD

INCORPORATION BY REFERENCE

The disclosure of Japanese Patent Application No. 2008-333758 filed on Dec. 26, 2008 including the specification, drawings and abstract is incorporated herein by reference in its entirety.

BACKGROUND OF THE INVENTION

1. Field of the Invention

The invention relates to a body detection apparatus and a body detection method. Mores specifically, the invention relates to a body detection apparatus that is mounted in a vehicle and is capable of appropriately grouping bodies that are approaching to the vehicle from neighboring areas, and such a body detection method.

2. Description of the Related Art

In recent years, a vehicle, such as a passenger automobile or the like, is equipped with a vehicle-mounted radar device that detects other vehicles, pedestrians, road-installed bodies, etc., that are present around the vehicle (hereinafter, referred to as "host vehicle"). The vehicle-mounted radar device detects a target that is approaching to the host vehicle from the front or a side of the host vehicle, and measures a relative distance, and a relative speed of the target relative to the host vehicle, as well as the direction (direction angle) in which the target, that is, the object body, exists, etc. Then, on the basis of results of detection, the vehicle-mounted radar device determines a risk of collision between the host vehicle and the target. An example of the foregoing vehicle-mounted radar device is a radar device disclosed in Japanese Patent Application Publication No. 8-160132 (JP-A-8-160132).

The vehicle-mounted radar device sometimes obtains a plurality of acquisition points when bodies present around the host vehicle are detected. An example of the case where the vehicle-mounted radar device obtains a plurality of acquisition points is a case where a plurality of vehicles are present around the host vehicle, and acquisition points are obtained from each of the plurality of vehicles.

Besides, in some cases, the vehicle-mounted radar device detects one vehicle present around the host vehicle, and detects a plurality of acquisition points from the one vehicle (since the vehicle is a body having a certain size). For example, in the case where a target is a large-size vehicle, such as a bus, a truck or the like, acquisition of a plurality of acquisition points from a single vehicle is remarkably often seen, in comparison with the case where the target is a passenger automobile.

Therefore, a common vehicle-mounted radar device performs a grouping process of estimating acquisition points detected by the vehicle-mounted radar device as being a single body on the basis of characteristics of the acquisition points.

For example, the radar device disclosed in JP-A-8-160132 finds a radius of curvature (curved line) along which the host vehicle is traveling, and finds a distance D from each acquisition point acquired by the radar device installed in the host vehicle to the curved line, and an angle θ of a line extending from the acquisition point to a center of a front portion of the host vehicle with respect to a forward axis direction of the host vehicle. Then, acquisition points that are similar to one another in the distances D and the angle θ are grouped together, and are estimated to be of a single body.

Concretely, as shown in FIG. 14, in the case where a plurality of acquisition points (an acquisition point P1 and an acquisition point P2 shown in FIG. 14) are obtained, the radar device disclosed in JP-A-8-160132 compare differences between distances D (distance D2−distance D1) from the acquisition points to a curving line R and differences between angles θ (angle θ2−angle θ1) with respect to the plurality of acquisition points. Then, the radar device disclosed in JP-A-8-160132 groups an acquisition point P1 and an acquisition point P2 together if distance D2−distance D1≦threshold value D, and the angle θ2−angle θ1≦threshold value θ. That is, the radar device estimates that the acquisition point P1 and the acquisition point P2 have been obtained from a vehicle 1 (a single body).

However, according to the radar device disclosed in JP-A-8-160132, there is possibility of estimation of acquisition points of a plurality of bodies as being in one group (being of a single body), depending on the positions of the bodies, or the traveling directions thereof. For example, let it assumed that, as shown in FIG. 15, a vehicle 2 and a vehicle 3 are present forward of the host vehicle, and the vehicle 2 and the vehicle 3 are detected by a radar device. As shown in FIG. 15, if distance D4−distance D3≦threshold value D, and angel θ4−angle θ3≦threshold value θ, there is possibility of the radar device grouping the acquisition point P3 and the acquisition point P4 together, and estimating the acquisition point P3 and the acquisition point P4 as having being obtained from a single body. That is, the radar device disclosed in JP-A-8-160132 may possibly estimate a plurality of vehicles as being one and the same vehicle in a case where the vehicles are moving adjacent to each other, or the like. Therefore, this related-art radar device is not able to always perform the grouping with sufficient accuracy.

SUMMARY OF THE INVENTION

The invention provides a body detection apparatus and a body detection method that are capable of accurately grouping objects that a radar device has detected.

A body detection apparatus in accordance with a first aspect of the invention is a body detection apparatus that is mounted in a vehicle, and that detects a body around the vehicle, the apparatus including: movement direction calculation portion that calculates a movement direction of each of acquisition points by using signals that show the acquisition points and that are obtained through detection of a body present around the vehicle; and determination portion that pre-sets a frame commensurate with a shape of a body as a detection object, and for pre-setting for the frame a reference traveling direction as an assumed traveling direction of the body, and for determining, among the acquisition points, acquisition points present within the frame whose reference traveling direction is aligned with the movement direction as being acquisition points of a single body.

According to the body detection apparatus in accordance with the first aspect, a plurality of targets detected by the radar device may be grouped on the basis of characteristics of movement of the targets, and characteristics of movement of the host vehicle. Therefore, the bodies detected by the radar device may be accurately grouped, so that acquisition points obtained from one and the same body may be appropriately determined as being acquisition points of the same body.

A body detection method in accordance with a second aspect of the invention is a body detection method that detects a body around a vehicle, the method including: calculating a movement direction of each of acquisition points by using signals that show the acquisition points that are obtained through detection of a body around the vehicle; and pre-setting a frame commensurate with a shape of a body that is handled as a detection object, and pre-setting for the frame a reference traveling direction as a traveling direction assumed on the body, and determining, among the acquisition points, acquisition points present within the frame whose reference traveling direction is aligned with the movement direction, as being acquisition points of a single body.

According to the body detection method in accordance with the second aspect of the invention, substantially the same effects as those of the foregoing body detection apparatus in accordance with the first aspect may be obtained.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Body detection apparatuses in accordance with embodiments of the invention will be described hereinafter with reference to the drawings. The following embodiments will be described in an assumed case where a driver support system (DSS) that includes the body detection apparatus is mounted in a vehicle (hereinafter, referred to as "host vehicle VM").

Figure 1:
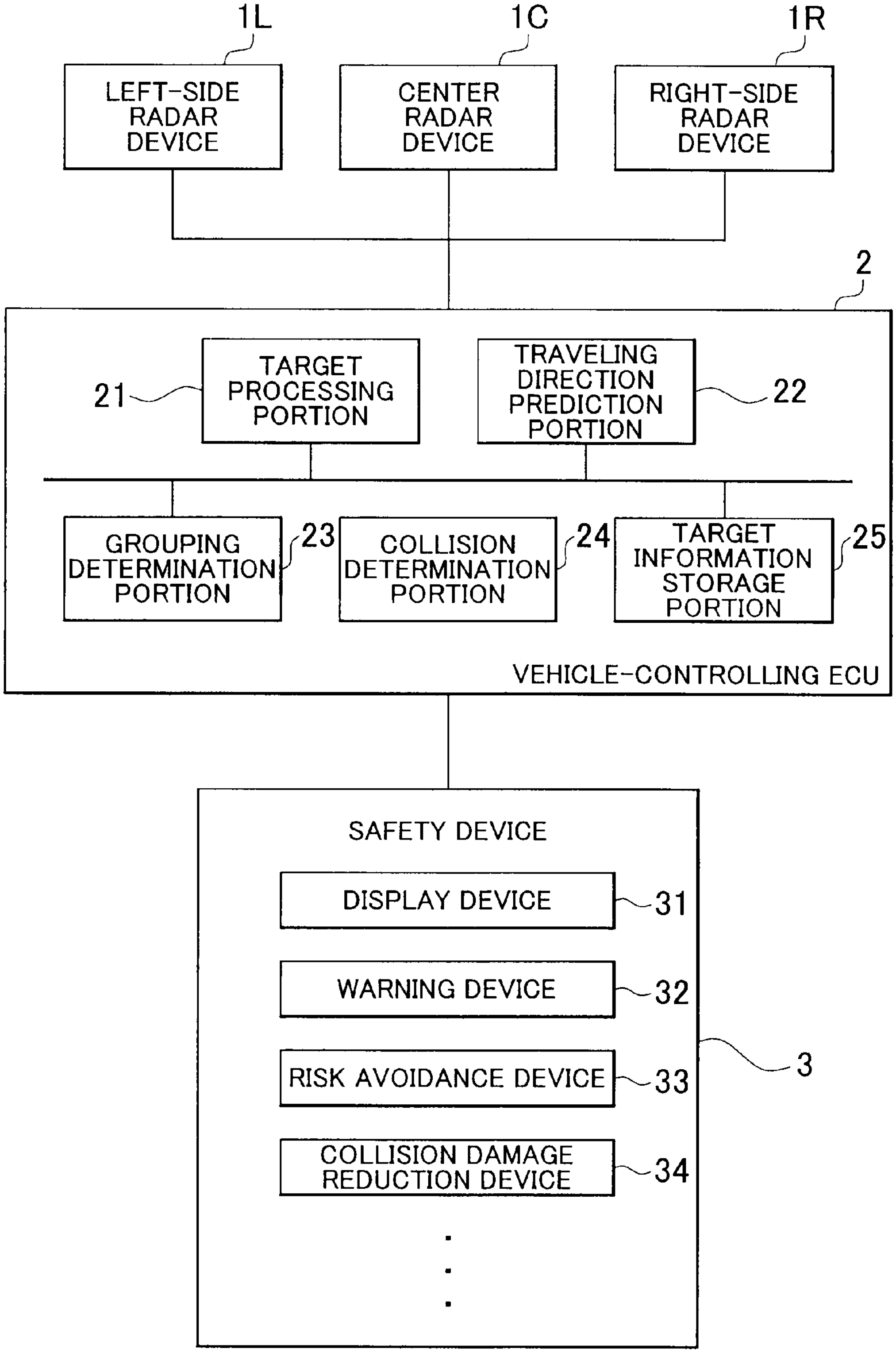
FIG. 1 is a block diagram showing a construction of a driver support system in accordance with an embodiment of the invention.

FIG. 1 is a block diagram showing a construction of a driver support system in accordance with an embodiment of the invention. As shown in FIG. 1, the driver support system is equipped with a left-side radar device 1L, a center radar device 1C, a right-side radar device 1R, a vehicle-controlling ECU (electrical control unit) 2, and a safety device 3.

Figure 2:
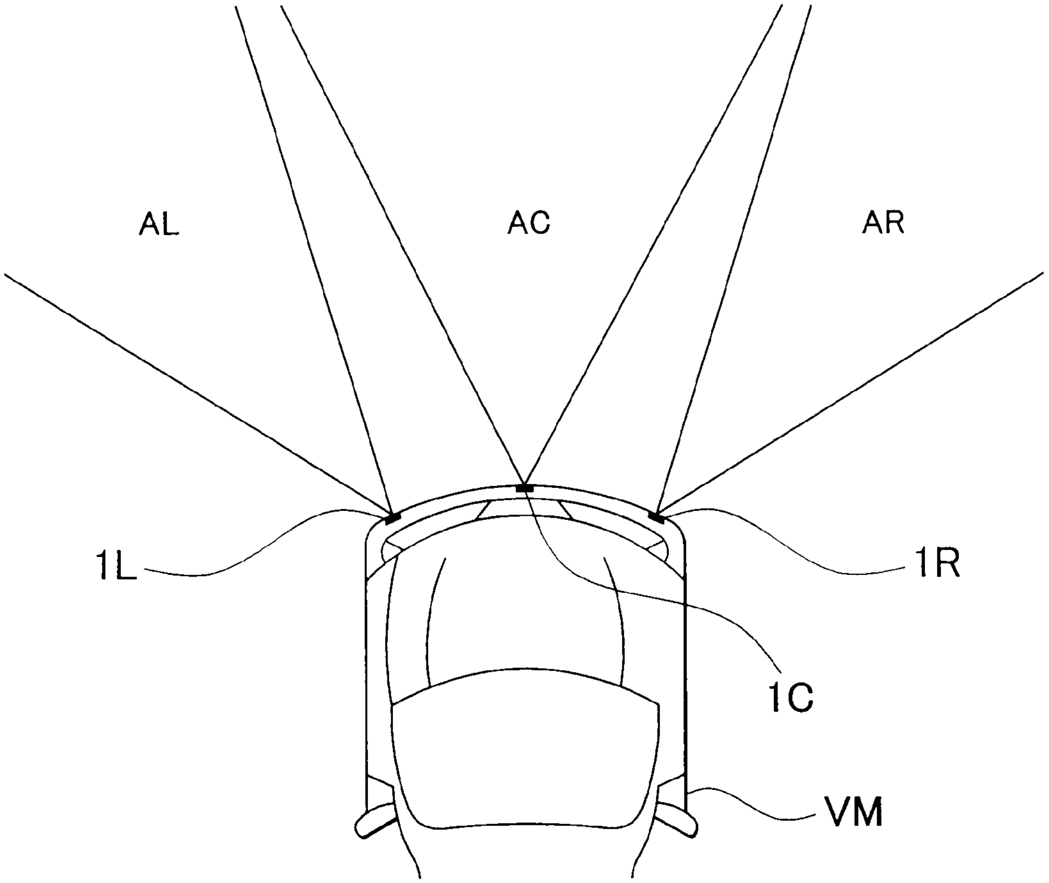
FIG. 2 is a diagram showing an example of the mounting positions of radar devices in accordance with the embodiment of the invention.

The right-side radar device 1R is installed at a predetermined position in the host vehicle VM (e.g., a position in the host vehicle VM at which a front-right headlight, or a front-right direction indicator, etc., is mounted), and radiates electromagnetic wave to an outer side of the host vehicle VM to monitor a neighboring area forward of the host vehicle VM. For example, as shown in FIG. 2, the right-side radar device 1R radiates electromagnetic wave diagonally forward right from the host vehicle VM, and detects targets (other vehicles, bicycles, pedestrians, buildings, etc.) that are present in a detection range (indicated by AR in FIG. 2) of the right-side radar device 1R.

The center radar device 1C is installed at a predetermined position in the host vehicle VM, (e.g., at the center of a front portion of the host vehicle VM), and radiates electromagnetic wave to the outside of the host vehicle VM to monitor the neighboring area forward of the host vehicle VM. For example, as shown in FIG. 2, the center radar device 1 radiates electromagnetic wave forward from the host vehicle VM, and detects targets (other vehicles, bicycles, pedestrians, buildings, etc.) that are present in the detection range of the center radar device 1C (indicated by AC in FIG. 2).

The left-side radar device 1L is installed at a predetermined position in the host vehicle VM (e.g., a position in the host vehicle VM at which a front-left headlight, or a front-left direction indicator, etc., is mounted), and radiates electromagnetic wave to an outer side of the host vehicle VM to monitor a neighboring area forward of the host vehicle VM. For example, as shown in FIG. 2, the left-side radar device 1L radiates electromagnetic wave diagonally forward left from the host vehicle VM, and detects targets (other vehicles, bicycles, pedestrians, buildings, etc.) that are present in a detection range (indicated by AL in FIG. 2) of the left-side radar device 1L.

Incidentally, the right-side radar device 1R, the center radar device 1C, and the left-side radar device 1L each radiate electromagnetic wave, and receive reflected wave. Then, each radar device detects, for example, a target that is present in a neighboring area forward or sideward of the vehicle, and outputs a signal of detection of the target to the vehicle-controlling ECU 2. If a radar device detects a plurality of targets, the radar device outputs signals of detection of the targets to the vehicle-controlling ECU 2 separately for each target.

Besides, the radar devices are not limited to an arrangement shown as an example in FIG. 2. For example, the radar arrangement may be made up of only a right-side radar device 1R and a left-side radar device 1L that are able to monitor a neighboring area forward of the host vehicle VM as well, or may also be made up of only a center radar device 1C that monitors a neighboring area forward of the host vehicle VM. That is, it suffices to install at least one radar device so that a neighboring area of the host vehicle VM in desired directions may be monitored.

Incidentally, the radar devices are substantially the same in construction, except that the radiation directions of electromagnetic wave are different. Therefore, in the following description, the right-side radar device 1R, the center radar device 1C, and the left-side radar device 1L will be collectively referred to simply as "the radar devices 1", unless these radar devices are particularly distinguished from each other.

Referring back to FIG. 1, the vehicle-controlling ECU 2 is an information processing device equipped with a target processing portion 21, a traveling direction prediction portion 22, a grouping determination portion 23, a collision determination portion 24, a target information storage portion 25, an interface circuit, etc.

The target processing portion 21 calculates target information, such as the position of a target, the speed thereof, the distance thereof, etc., relative to the host vehicle VM, using a signal obtained from the radar device 1. For example, the target processing portion 21 calculates the relative distance, the relative speed, the relative position, etc., of the target, relative to the host vehicle VM, using the sum and the difference between the irradiation wave radiated from the radar device 1 and the reflected wave, or the timings of sending and receiving the waves, etc. Concretely, if the right-side radar device 1R detects a target, and outputs a signal of detection of the target to the vehicle-controlling ECU 2, the target processing portion 21 generates, as target information ir, information that includes the relative distance, the relative speed, the relative position, etc., of the target relative to the right-side radar device 1R.

Likewise, with regard to each of the center radar device 1C and the left-side radar device 1L, the target processing portion 21 also calculates the relative distance, the relative speed, the relative position, etc., of a target relative to the radar device, by using a signal obtained due to the detection of the target by the center radar device 1C or the left-side radar device 1L. Then, the target processing portion 21 generates, as target information ic, information that includes the relative distance, the relative speed, the relative position, etc., of the target relative to the center radar device 1C. Besides, the target processing portion 21 generates, as target information il, information that includes the relative distance, the relative speed, the relative position, etc., of the target relative to the left-side radar device 1L.

Furthermore, the target processing portion 21 performs a process of transforming the position of the target detected by the radar device 1 into a position in a ground fixed coordinate system whose origin is set at an arbitrary position. For example, in the case where the right-side radar device 1R detects a target and the vehicle-controlling ECU 2 performs processing through the use of a signal from the right-side radar device 1R, it is a general practice to calculate the position of the target in a coordinate system whose reference position is a position at which the right-side radar device 1R is installed. Therefore, in order to adopt the same reference position for targets output from each radar device 1, the target processing portion 21 performs a process of transforming the positions of the targets into positions shown in a ground fixed coordinate system whose origin is an arbitrary position (the same applies to the cases where a target is detected by the center radar device 1C or the left-side radar device 1L).

The traveling direction prediction portion 22 predicts a traveling direction of each target on the basis of the target information input from the target processing portion 21 (predicts a traveling path along which the target is going to move toward the host vehicle VM). Furthermore, the traveling direction prediction portion 22 also predicts a traveling direction of the host vehicle VM (predicts a traveling path along which the host vehicle VM is going to travel) from the vehicle speed, the yaw rate, etc., of the host vehicle. Incidentally, the target processing portion 21 and the traveling direction prediction portion 22 correspond to an example of movement direction calculation portion in the invention.

The grouping determination portion 23, although described in detail below, performs a grouping process of estimating a plurality of targets detected by any radar device 1 as being a single body, on the basis of characteristics of movement of the targets and a characteristic of movement of the host vehicle VM. Incidentally, the grouping determination portion 23 corresponds to an example of determination portion in the invention.

The collision determination portion 24 determines whether or not the host vehicle VM and the target are going to collide, on the basis of the information input from the target processing portion 21 and the grouping determination portion 23. For example, the collision determination portion 24 calculates an amount of time prior to the collision between the host vehicle VM and the target, that is, a predicted collision time (TTC (time to collision)), separately for each target, or separately for each of the groups determined. If a result of the calculation of the TTC is shorter than a predetermined time, the collision determination portion 24 instructs the safety device 3 to take a safety measure. Incidentally, the TTC may be determined by, for example, dividing the relative distance by the relative speed (TTC=relative distance/relative speed). Incidentally, the collision determination portion 24 corresponds to an example of collision determination portion in the invention.

The target information storage portion 25 is a storage medium that temporarily stores the target information that the target processing portion 21 generates. Besides, the target information storage portion 25 stores, in a time-series fashion, pieces of information that the target processing portion 21 generates.

Incidentally, the radar device 1 may also perform the foregoing processing of the vehicle-controlling ECU 2 within the radar device 1. For example, in the case where a plurality of radar devices are mounted in the host vehicle VM, the signals output from the radar devices are all gathered to the vehicle-controlling ECU 2. Therefore, if the foregoing process of the vehicle-controlling ECU 2 is performed in the right-side radar device 1R, it becomes possible to perform processing only with regard to the targets detected by the right-side radar device 1R, so that the processing load is reduced in comparison with a construction in which all the signals output from the radar devices are gathered to the vehicle-controlling ECU 2.

The safety device 3, following the instruction from the vehicle-controlling ECU 2, alerts the driver of the host vehicle VM if the possibility of collision with a target is high. Besides, the safety device 3 includes various devices for protecting occupants of the host vehicle VM and mitigating the collision conditions so as to reduce the damages to the occupants in the case where the collision with a target is unavoidable. Hereinafter, actions that the safety device 3 performs, that is, the collision risk-avoiding actions or the collision damage-reducing actions, are collectively termed the safety measurements.

Examples of a device that constitutes the safety device 3 will be presented below. As shown in FIG. 1, the safety device 3 includes, for example, a display device 31, such as a warning lamp or the like, a warning device 32, such as a warning buzzer or the like. Then, the safety device 3 also includes a risk avoidance device 33 that assists a brake operation that the driver of the host vehicle VM performs in order to avoid the risk of collision with a target, and a collision damage reduction device 34 that enhances the restraint of the occupants of the host vehicle VM to reduce the collision damages by winding up a seatbelt, or moving a seat. Furthermore, the collision damage reduction device 34 disengages the safety devices of an airbag, or changes the seat position to a position that is prepared for a collision. Incidentally, the foregoing devices that are included in the safety device 3 are mere examples, and are not restrictive at all.

Thus, the target processing portion 21 generates target information, using the signals obtained from the radar devices 1. Then, the grouping determination portion 23 performs a grouping process of estimating a plurality of targets detected by the radar devices 1 as being a single body on the basis of characteristics of movement of the targets, and a characteristic of movement of the host vehicle VM. Furthermore, the collision determination portion 24 determines whether or not the host vehicle VM collides with target, that is, targets that are regarded as a single body, on the basis of the information input from the target processing portion 21 and the grouping determination portion 23, and gives an appropriate instruction to the safety device 3.

In the case where the radar device 1 detects a vehicle present around the host vehicle VM, a plurality of acquisition points may sometimes be obtained since vehicles are an object having a certain size. Therefore, in some cases, it is determined that a plurality of vehicles are present although actually only one vehicle around the host vehicle is detected. A related art technology for this case is a technique in which a frame of a common vehicle (motor vehicle) is set, and a plurality of targets are grouped, besides the grouping technique shown in JP-A-8-160132.

Figure 3:
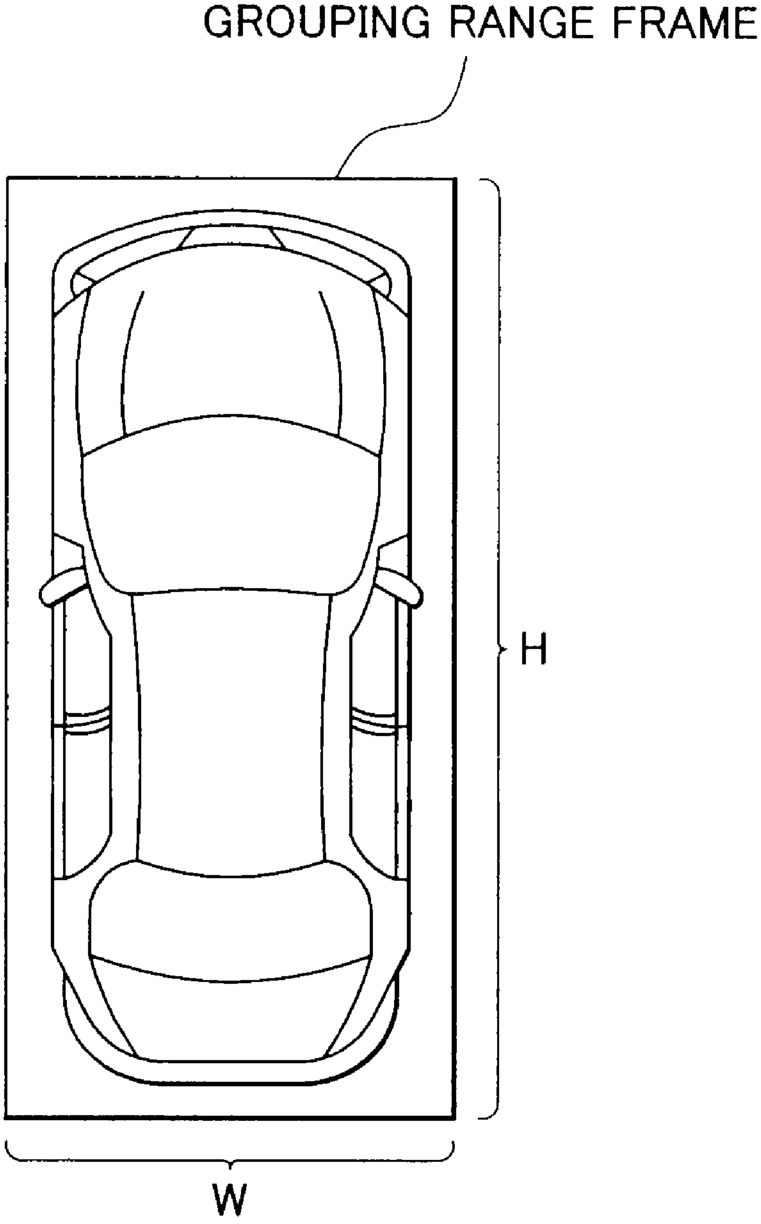
FIG. 3 is a diagram showing a grouping range frame as a comparative example.
Figure 4A:
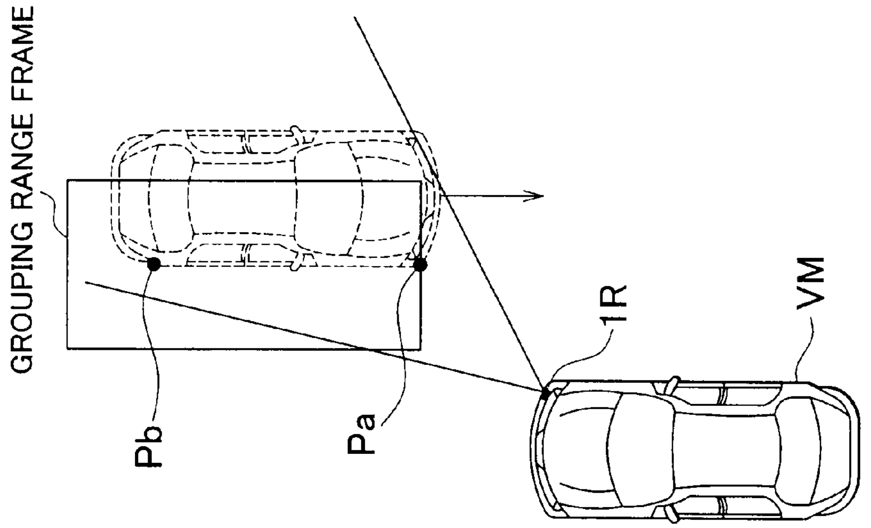
FIGS. 4A and 4B are diagrams each showing a grouping technique as a comparative example that uses the grouping range frame shown in FIG. 3.
Figure 4B:
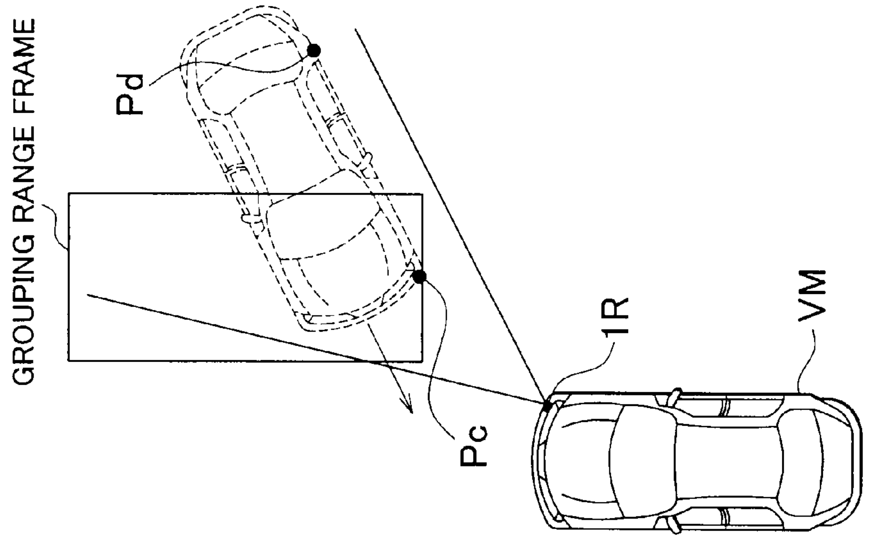

A grouping technique as a comparative example will be described with reference to FIGS. 3, 4A and 4B. FIG. 3 is a diagram showing a grouping range frame as a comparative example. FIGS. 4A and 4B are diagrams each showing a grouping technique as a comparative example that uses the grouping range frame shown in FIG. 3.

In the grouping technique of the comparative example, firstly a grouping range frame factoring in a size of a vehicle (motor vehicle) as shown in FIG. 3 is set. Then, the grouping is performed by determining whether or not a target detected by a radar device 1 is in the grouping range frame, with respect to each of the detected target. As for the size of the grouping range frame, the length H and the width W are set at values determined by giving margins to the length and width of a common motor vehicle.

Next, the grouping technique in accordance with the comparative example will be concretely described, for example, in conjunction with an assumed case where the right-side radar device 1R detects two targets, with reference to FIGS. 4A and 4B. As shown in FIG. 4A, for example, a case where the right-side radar device 1R mounted in the host vehicle VM detects two targets Pa and Pb is assumed. In this case, according to the grouping technique of the comparative example, the grouping range frame is applied to the two targets Pa and Pb detected by the right-side radar device 1R, with reference to a target that is the nearest to the host vehicle VM (the target Pa in FIG. 4A). Then, the targets existing within the grouping range frame (concretely, the targets Pa and Pb shown in FIG. 4A) are regarded as a single body, and are therefore grouped together. That is, the targets detected by the right-side radar device 1R are estimated as being acquisition points that have been obtained by detecting one and the same vehicle as shown by interrupted lines in FIG. 4A.

However, in the foregoing grouping technique, a case is conceivable in which appropriate grouping may not be performed on a vehicle that is moving obliquely toward the host vehicle VM. For example, as shown in FIG. 4B, a case where the right-side radar 1R mounted in the host vehicle VM detects two targets Pc and Pd is assumed. Then, a grouping range frame is applied to the two targets Pc and Pd detected by the right-side radar device 1R, with reference to a target that is the nearest to the host vehicle VM (the target Pc shown in FIG. 4B). Thus, as shown in FIG. 4B, the target Pd does not fall within the grouping range frame. That is, in the case where the targets Pc and Pd detected by the right-side radar device 1R are acquisition points obtained by detecting one and the same vehicle that is taking a position relative to the grouping range frame as shown by interrupted lines in FIG. 4B, the two targets Pc and Pd may not be estimated as being on the same vehicle although the targets Pc and Pd are acquisition points obtained by detecting the same vehicle.

Therefore, taking into account characteristics of the movement of the target detected by each radar device 1, the grouping determination portion 23 of the vehicle-controlling ECU 2 of the body detection apparatus in accordance with the embodiment performs the appropriate grouping of targets that are approaching obliquely to the host vehicle VM as well as targets that are coming closer to the host vehicle VM from the front. Because of this, the targets detected by each radar device 1 may be accurately grouped. Actions of the vehicle-controlling ECU 2 will be described in detail below.

Figure 5:
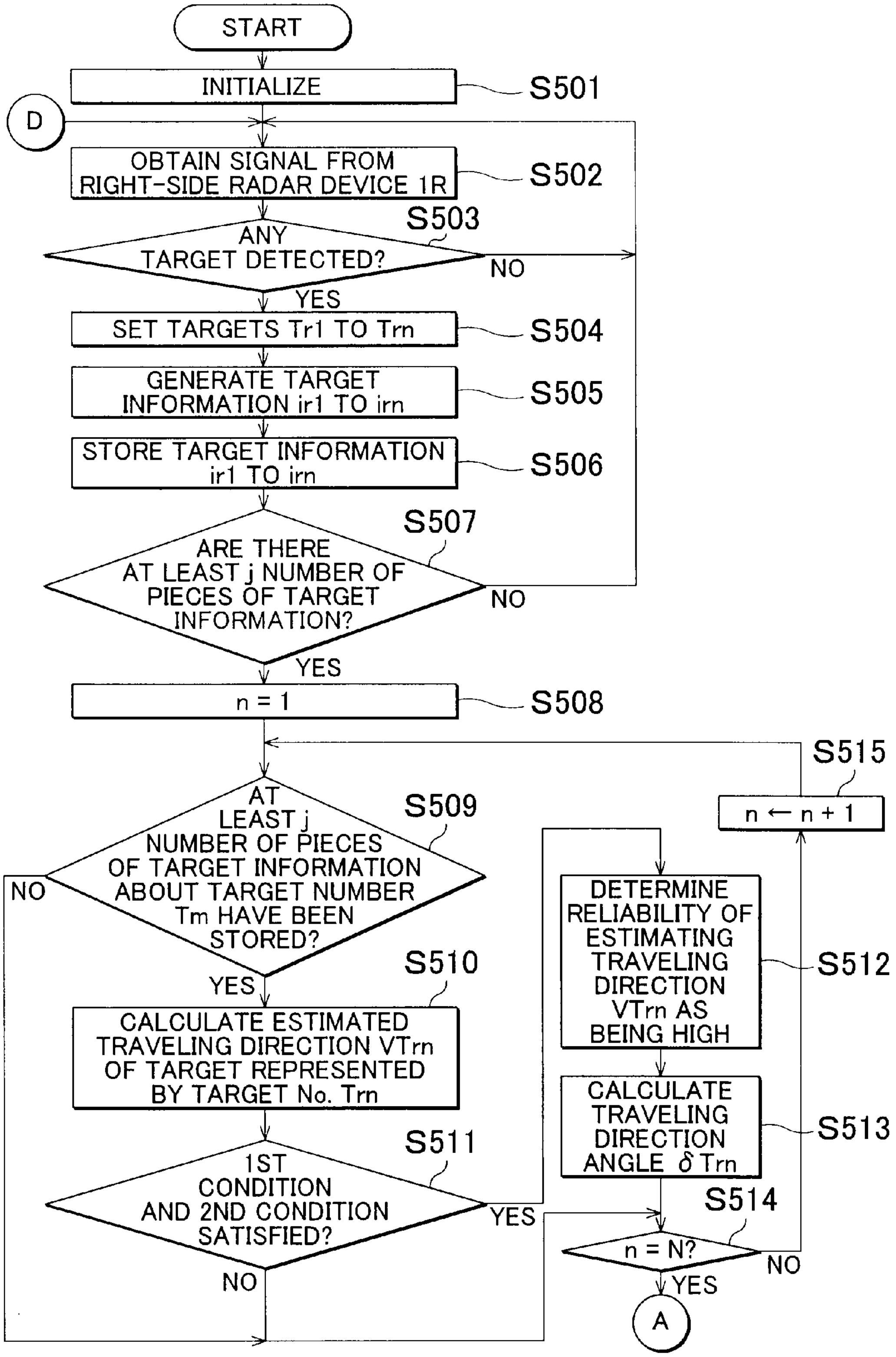
FIG. 5 is a flowchart showing an example of an earlier part of a process that is performed by various portions of a vehicle-controlling ECU of a body detection apparatus in accordance with the embodiment of the invention.
Figure 6:
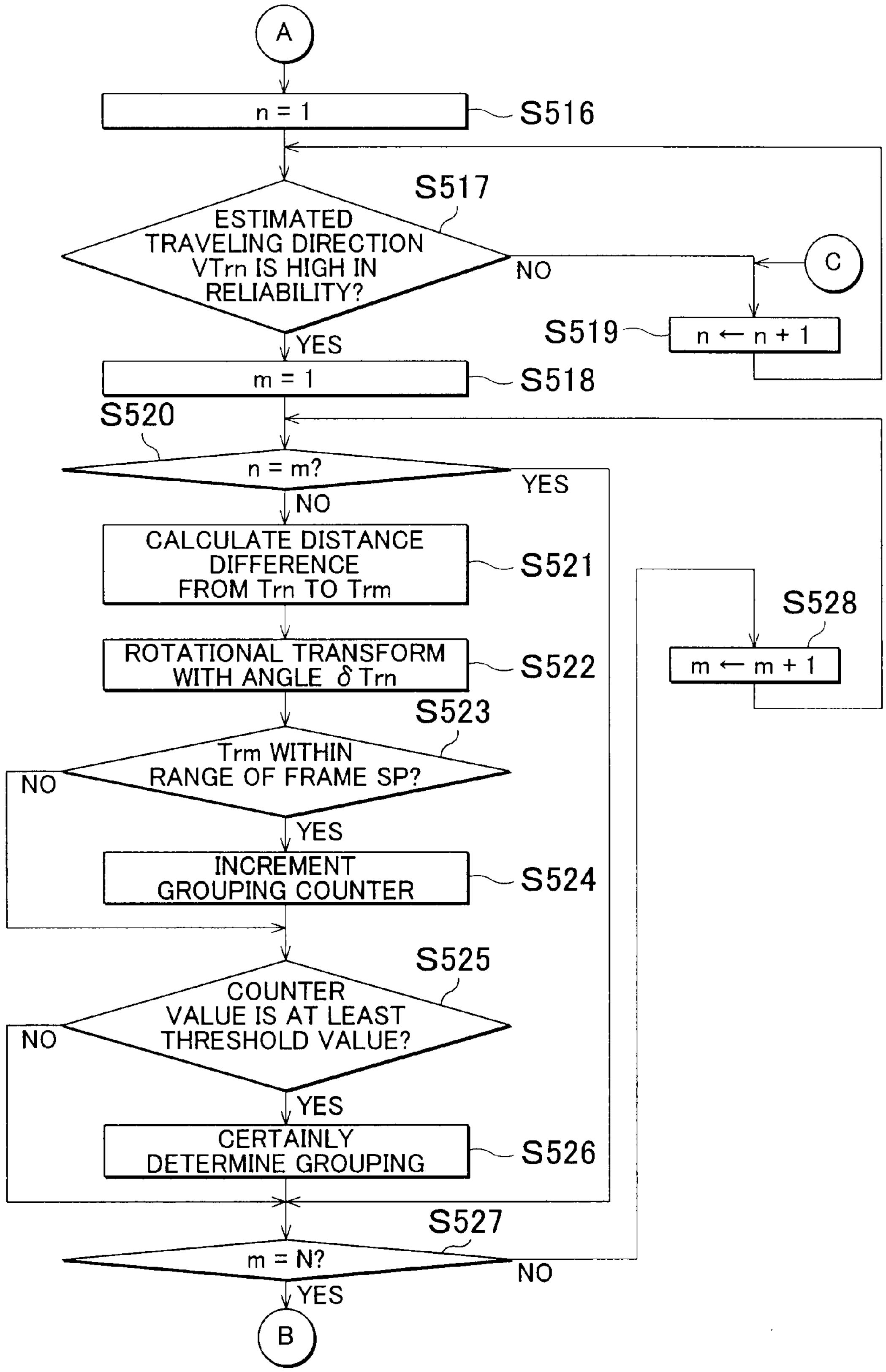
FIG. 6 is a flowchart showing an example of an intermediate part of the process performed by various portions of the vehicle-controlling ECU of the body detection apparatus in accordance with the embodiment of the invention.
Figure 7:
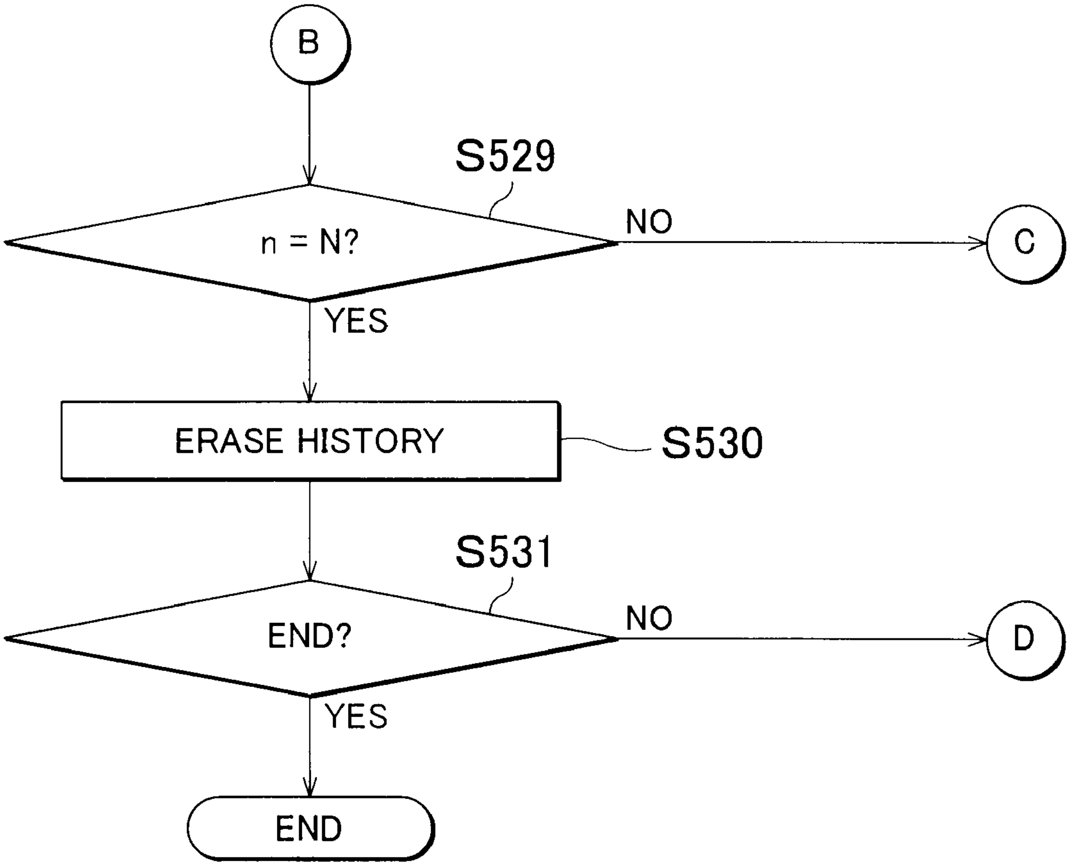
FIG. 7 is a flowchart showing an example or a later part of the process performed by various portions of the vehicle-controlling ECU of the body detection apparatus in accordance with the embodiment of the invention.

With reference to FIGS. 5, 6 and 7, examples of actions that various portions of the vehicle-controlling ECU 2 in accordance with this embodiment perform will be described. In the following description, examples of processes performed when the vehicle-controlling ECU 2 receives signals from the right-side radar device 1R on the assumption that the right-side radar device 1R has acquired targets.

FIGS. 5, 6 and 7 show a flowchart illustrating an example of processes performed in various portions of the vehicle-controlling ECU 2 in accordance with the body detection apparatus of this embodiment. The process of the flowchart shown in FIGS. 5, 6 and 7 is carried out by the vehicle-controlling ECU 2 executing a predetermined program that is provided in the vehicle-controlling ECU 2. Besides, the program for executing the process shown in FIGS. 5, 6 and 7 is, for example, pre-stored in a storage region that is provided in the vehicle-controlling ECU 2. The process of the flowchart shown in FIGS. 5, 6 and 7 is executed by the vehicle-controlling ECU 2 when the power of the vehicle-controlling ECU 2 is turned on (e.g., when the driver of the host vehicle VM performs an operation or the like for starting the execution of the process of the flowchart, or when an ignition switch of the host vehicle VM is turned on, etc.)

In step S501 in FIG. 5, the target processing portion 21 executes initialization. Concretely, the target processing portion 21 erases the target information from the target information storage portion 25 if any is stored, and clears a grouping counter if it is not cleared.

In step S502, the target processing portion 21 obtains a signal of detection of a target from the right-side radar device 1R, and the process proceeds to step S503. Incidentally, if the right-side radar device 1R does not detect a target (concretely, if no target is present in a neighboring area forward of the host vehicle VM), the right-side radar device 1R outputs to the target processing portion 21 a signal that indicates that the number of targets is 0 (there is no target).

In step S503, the target processing portion 21 determines whether or not there is any target detected by the right-side radar device 1R. Concretely, the target processing portion 21 determines whether or not the right-side radar device 1R has detected any target, on the basis of the signal obtained from the right-side radar device 1R in step S502. Then, in the case where an affirmative determination is made by the target processing portion 21 in step S503 (YES in step S503), the target processing portion 21 proceeds to step S504. In the case where the determination is negative (NO in step S503), the target processing portion 21 returns to step S502, in which the target processing portion 21 obtains a signal again. That is, the target processing portion 21 may not proceed to step S504, unless the right-side radar device 1R actually detects a target. In the case where the right-side radar device 1R does not detect a target, the process returns to step S502. The foregoing case where a negative determination is made in step S503 is, for example, a case where no body exists within the detection range AR of the right-side radar device 1R, or the like.

In step S504, the target processing portion 21 sets a target No. Trn for the target that the right-side radar device 1R has detected, using the signal obtained from the right-side radar device 1R.

In step S505 subsequent to the setting of target No. Trn, the target processing portion 21 generates target information irn about the target represented by target No. Trn, using the signal obtained from the right-side radar device 1R. For example, assuming a target that is given target No. Tr1 by the target processing portion 21 in step S504, the target processing portion 21 generates as the target information ir1 information that includes the relative distance, the relative speed, the relative position, etc., of the target relative to the right-side radar device 1R, using the signal from the right-side radar device 1R. That is, the target information about the target represented by target No. Tr1 may be represented as information ir1. Then, the target processing portion 21 proceeds to step S506.

Incidentally, as for the assigning a target No. Trn in step S504, if the right-side radar device 1R detects a target that has already been detected, the target processing portion 21 gives the target one and the same number Trn. In the case where the right-side radar device 1R detects a new target, the target processing portion 21 gives the target a target number Trn whose suffix number irn is the lowest among the target numbers Trn with which target information irn has not been stored in the target information storage portion 25. For example, if after detecting the target represented by target No. Tr1, the right-side radar device 1R detects a new target, the target processing portion 21 determines the new target as being a target that is to be given target No. Tr2, and assigns target No. Tr2 to the target.

In step S506, the target processing portion 21 temporarily stores the target information irn about each target that is generated in step S505, in a time sequence in the target information storage portion 25. Concretely, due to the repeated execution of the process of the flowchart, the target information storage portion 25 stores the pieces of target information irn indicated by target Nos. Trn, in a time sequence. For example, this will be described in conjunction with a target represented by target No. Tr1. If the target information storage portion 25 is capable of storing K number of pieces of target information ir1 for each target, the target information storage portion 25 stores the target information ir1 about the target represented by target No. Tr1 in a time sequence of pieces of target information ir1(1), ir1(2), ir1(3), ir1(4), . . . , ir1(*k*), . . . , ir(K−1), and ir(K) as the process of the flowchart is repeatedly executed. Incidentally, in this case, with regard to the target represented by target No. Tr1, the present-time latest target information is the piece of target information ir1(K). Then, the target processing portion 21 proceeds to the process of step S507 after the target information irn is temporarily stored in a time sequence into the target information storage portion 25.

In step S507, the target processing portion 21 determines whether or not there is any set of target information that includes at least j number of pieces of target information. That is, in step S507, the target processing portion 21 determines whether or not there is at least one target about which the target information irn stored in the target information storage portion 25 includes at least j number of pieces of target information irn(k), among the targets indicated by the target numbers Trn stored in the target information memory portion 25.

Incidentally, as will become apparent in the below description, in order to predict the traveling direction of a target, the traveling direction prediction portion 22 needs a plurality of pieces of past-time target information irn about the target which include a piece of target information irn(K) that is the latest at the present time point. To that end, in the process of step S507, the target processing portion 21 determines whether or not at least a predetermined number (hereinafter, referred to as "j number") of pieces of target information irn that include the latest piece of target information irn(K) are stored in the target information storage portion 25. In other words, the target processing portion 21 determines in the process of step S507 whether or not pieces of target information irn(K) back to irn(K−(j−1)) are stored in the target information storage portion 25, with respect to each target.

For example, in the case where j=5, and where at the time of the determination in step S507, the number of pieces of target information ir1 in the history of a target represented by target No. Tr1 (including the latest piece of target information) is four, and the number of pieces of target information ir2 in the history of a target represented by target No. Tr2 (including the latest piece of target information) is five, then the determination in step S507 becomes affirmative since there is at least one target about which at least five pieces (j number of pieces) of target information irn are stored (in this case, the target represented by target No. Tr2). That is, regarding the target represented by target No. Tr2, five pieces of target information, that is, the latest piece of target information ir1(K), and the older pieces of target information ir2(K−1), ir2(K−2), ir2(K−3), and ir2(K−4), are stored in the target information storage portion 25.

Then, if an affirmative determination is made in step S507 (YES in S507), the target processing portion 21 proceeds to step S508. That is, the determination in step S507 becomes affirmative if there is at least one target about which j number of pieces of target information irn(K) back to irn(K−(j−1)) are stored.

On the other hand, if a negative determination is made in step S507 (NO in S507), the target processing portion 21 returns to step S502.

Thus, the target processing portion 21 is able to generate target information irn about a target that is represented by target No. Trn, and to store the information into the target information storage portion 25, by performing the process of step S502 to step S507.

In step S508, the traveling direction prediction portion 22 sets a temporary variable n for use in the process of this flowchart at 1, and proceeds to step S509.

In step S509, the target processing portion 21 determines whether or not at least j number of pieces of target information irn about the target of target No. Trn have been stored. If the determination is affirmative (YES in S509), the target processing portion 21 proceeds to step S510. On the other hand, if the determination is negative (NO in S509), the target processing portion 21 proceeds to step S514.

For example, in the case where it is found that the right-side radar device 1R has detected five targets (targets represented by target Nos. Tr1, Tr2, Tr3, Tr4, and Tr5), by repeatedly executing the process of this flowchart, the target processing portion 21 determines in step S509 whether or not at least j number of pieces of target information ir1 about the target represented by target No. Tr1 have been stored. If at least j number of pieces of target information ir1 have not been stored, the target processing portion 21 makes a negative determination in step S509, and proceeds to step S514. Then, if the determination in step S514 is negative ($n \neq N=5$), the target processing portion 21 adds 1 to n in step S515, and then in step S509 determines whether or not at least j number of pieces of target information ir2 about the target represented by target No. Tr2 have been stored.

Figure 8:
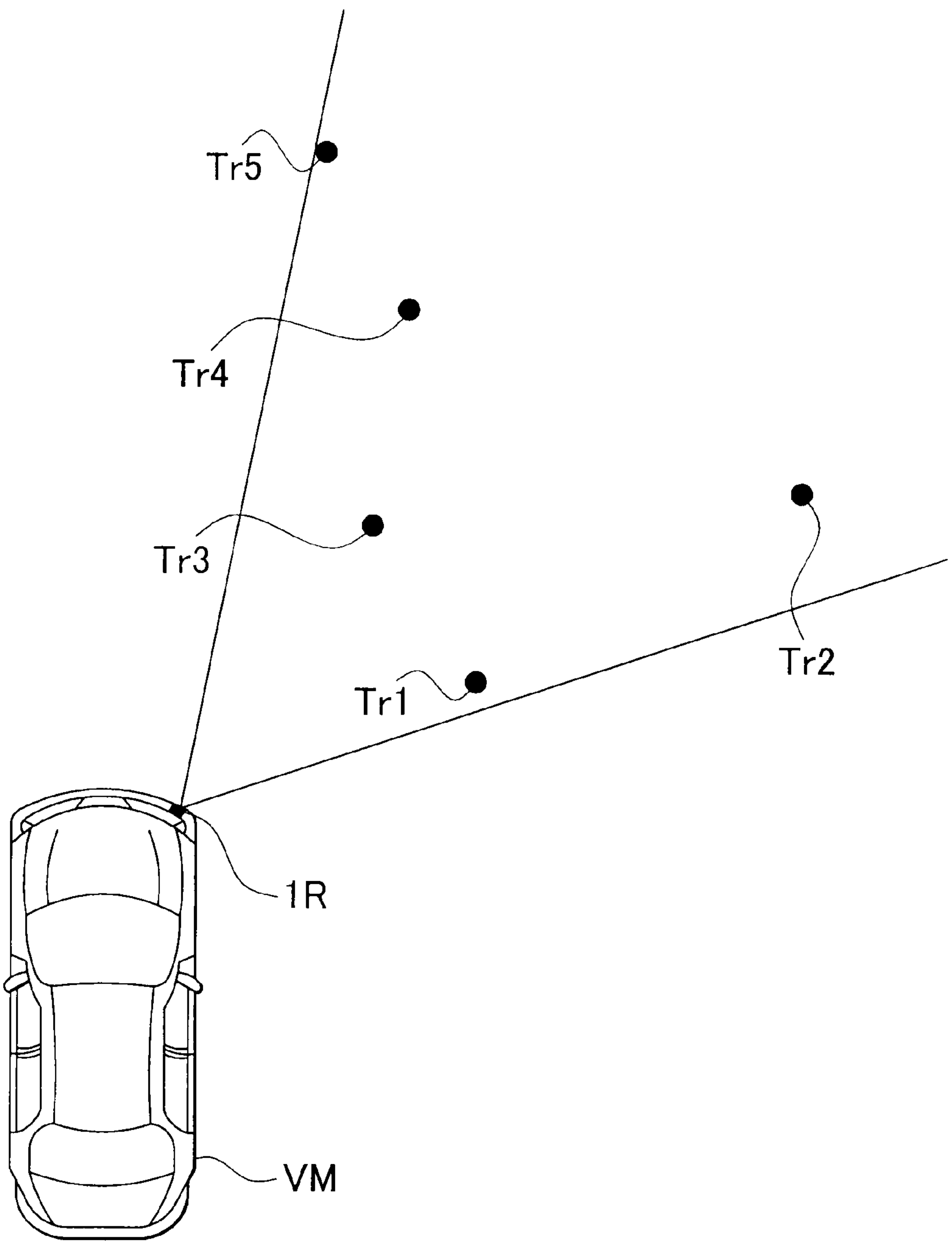
FIG. 8 is a diagram showing a situation in which targets are detected by a right-side radar device in accordance with the embodiment of the invention.

Incidentally, description will be continued below, on the assumption that at last j number of pieces of target information about each target have been stored in the case where it is found that the right-side radar device 1R has detected five targets (targets represented by target Nos. Tr1, Tr2, Tr3, Tr4 and Tr5) as shown in FIG. 8, by repeatedly executing the process of the flowchart shown in FIGS. 5 to 7.

In step S510, the traveling direction prediction portion 22 calculates an estimated traveling direction VTrn of the target represented by target No. Trn. Concretely, the traveling direction prediction portion 22 calculates the estimated traveling direction VTrn of the target given target No. Trn, according to the present-time temporary variable n. The concrete process that the traveling direction prediction portion 22 performs in step S510 will be described with reference to FIG. 9, in conjunction with the target represented by target No. Tr1 as an example.

Figure 9:
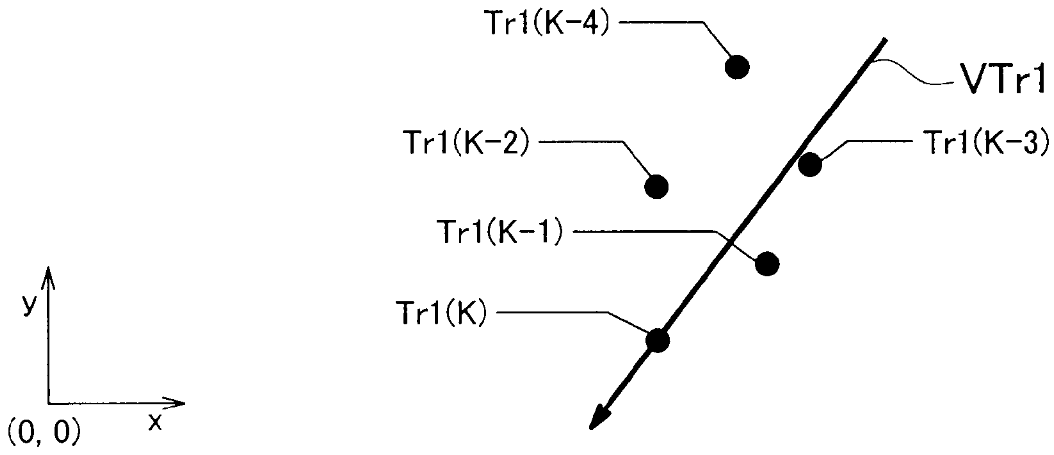
FIG. 9 is a diagram showing a situation of detection of a target represented by target No. Tr1 stored in a target information storage portion in accordance with the embodiment of the invention.

FIG. 9 is a diagram showing the situation of detection of the target represented by target No. Tr1 stored in the target information storage portion 25. Incidentally, to simplify the following description, it is assumed that number of pieces of target information irn that the traveling direction prediction portion 22 needs in order to predict the traveling direction of a target represented by target No. Tr1 (which corresponds to j number in step S507) is five. That is, in conjunction with the target represented by target No. Tr1, as for an example, the traveling direction VTr1 of the target represented by target No. Tr1 is predicted through the use of the latest piece of target information ir1(K) as well as the past-time pieces of target information ir1(K−1), ir1(K−2), ir1(K−3), and ir1(K−4), as shown in FIG. 9.

Concretely, in step S510, the traveling direction prediction portion 22 plots points in a ground fixed coordinate system (x, y) whose origin is an arbitrary position, regarding the position of each of the targets detected by the right-side radar device 1R, using the pieces of target information ir1(K) to ir1(K−4) stored in the target information storage portion 25 (see FIG. 9). Then, the traveling direction prediction portion 22 finds the slope of an approximation straight line by the method of least squares, regarding each point. Furthermore, the traveling direction prediction portion 22 finds a straight line that passes through the latest target (concretely, the point represented by the piece of target information ir1(K)), and that has the foregoing slope, and calculates the direction of this straight line as a predicted traveling direction VTr1 of the target. Then, the traveling direction prediction portion 22 proceeds to step S511. Incidentally, the direction of a vector (the direction of an arrow of the predicted traveling direction VTr1) is set by the direction in which the target represented by target No. Tr1 travels.

Referring back to FIG. 5, in step S511, the traveling direction prediction portion 22 calculates a reliability of the estimated traveling direction VTrn of the target given target No. Trn. Concretely, the reliability of the estimated traveling direction VTrn of the target represented by target No. Trn is calculated on the basis of whether or not the target information irn used in the traveling direction VTrn-calculating process of step S510 satisfies a first condition and a second condition.

Concretely, the first condition and the second condition are as follows. The first condition is whether in the target information irn(k) having been used in predicting the traveling direction VTrn, the proportion of ordinary recognition points is higher than or equal to a certain proportion. The second condition is whether the movement distance is longer than or equal to a predetermined distance.

The first condition is whether or not the proportion of ordinary recognition points is higher than or equal to a certain value, in the history of the target information irn, including the latest piece of target information irn(K), that was used in predicting the estimated traveling direction VTrn. As described above, the target information irn is calculated by the target processing portion 21, through the use of the signal obtained from the right-side radar device 1R. However, for example, depending on the strength of a signal output from the right-side radar device 1R, it sometimes happens that only a portion of the information provided as the target information irn (the relative distance, the relative speed, the relative position, etc., of the target relative to the host vehicle VM) may be calculated. That is, with regard to the target represented by target No. Trn which has been detected by the right-side radar device 1R, it is determined whether or not the entire information regarding the target represented by target No. Trn is contained at a certain proportion or greater in the target information irn(k) used in predicting the traveling direction VTrn. Incidentally, the target information irn(k) that includes the entire information regarding the target represented by target No. Trn is referred to as "ordinary recognition point". Then, the traveling direction prediction portion 22 determines whether or not the proportion of the ordinary recognition points was higher than or equal to a certain proportion, with reference to the target information irn(k) used in predicting the traveling direction VTrn. Incidentally, in the case of extrapolation points as well as the foregoing case of ordinary recognition points, the target information sometimes contains information regarding position, speed, etc. However, since the information regarding the position, the vehicle speed, etc. is information obtained through estimation, the information obtained from extrapolation points is not included for the determination regarding the first condition.

The second condition is whether or not the movement distance is greater than or equal to a certain distance. The movement distance of a target herein is a distance that is obtained with reference to the latest and oldest pieces of target information of the pieces of target information irn(k) used in calculating the estimated traveling direction VTrn. Concretely, in the example shown in FIG. 9, the moving distance of the target is a distance that is obtained with reference to the latest piece of target information ir1(K) and the oldest piece of target information ir(K−4) of the pieces of target information ir1(*k*) used in calculating the estimated traveling direction VTr1. That is, the traveling direction prediction portion 22 calculates the movement distance of the target represented by target No. Tr1, during a period from the storage of the piece of target information ir1(K−4) until the storage of the piece of target information ir1(K). Then, the traveling direction prediction portion 22 determines whether or not the calculated movement distance is greater than or equal to a predetermined distance. Incidentally, the case that fails to satisfy the second condition is, for example, a case where the moving speed of a target is slow and there is not much change found in the position of the target at the time of reference to the history of the target information. That is, the second condition is provided because if the movement distance of a target is less than a certain distance, the reliability of the direction vector declines.

If in step S511 the foregoing first and second conditions are both satisfied, the traveling direction prediction portion 22 makes an affirmative determination (YES in S511), and proceeds to step S512. On the other hand, if the determination in step S510 is negative (NO in S511), the traveling direction prediction portion 22 proceeds to step S514. Incidentally, the case where the determination in step S511 becomes negative (NO in S511) is a case where with regard to the target represented by target No. Trn, an estimated traveling direction VTrn of the target is predicted, but the reliability of the estimated traveling direction VTrn is not high. Conversely, the reliability of the estimated traveling direction VTrn of a target represented by target No. Trn that satisfies both the first condition and the second condition may be said to be high.

In step S512, the traveling direction prediction portion 22 determines that the traveling direction VTrn of the target represented by target No. Trn is high in reliability. Then, the traveling direction prediction portion 22 stores into the target information storage portion 25 information that the reliability of the traveling direction VTrn of the target represented by target No. Trn is high.

Figure 10:
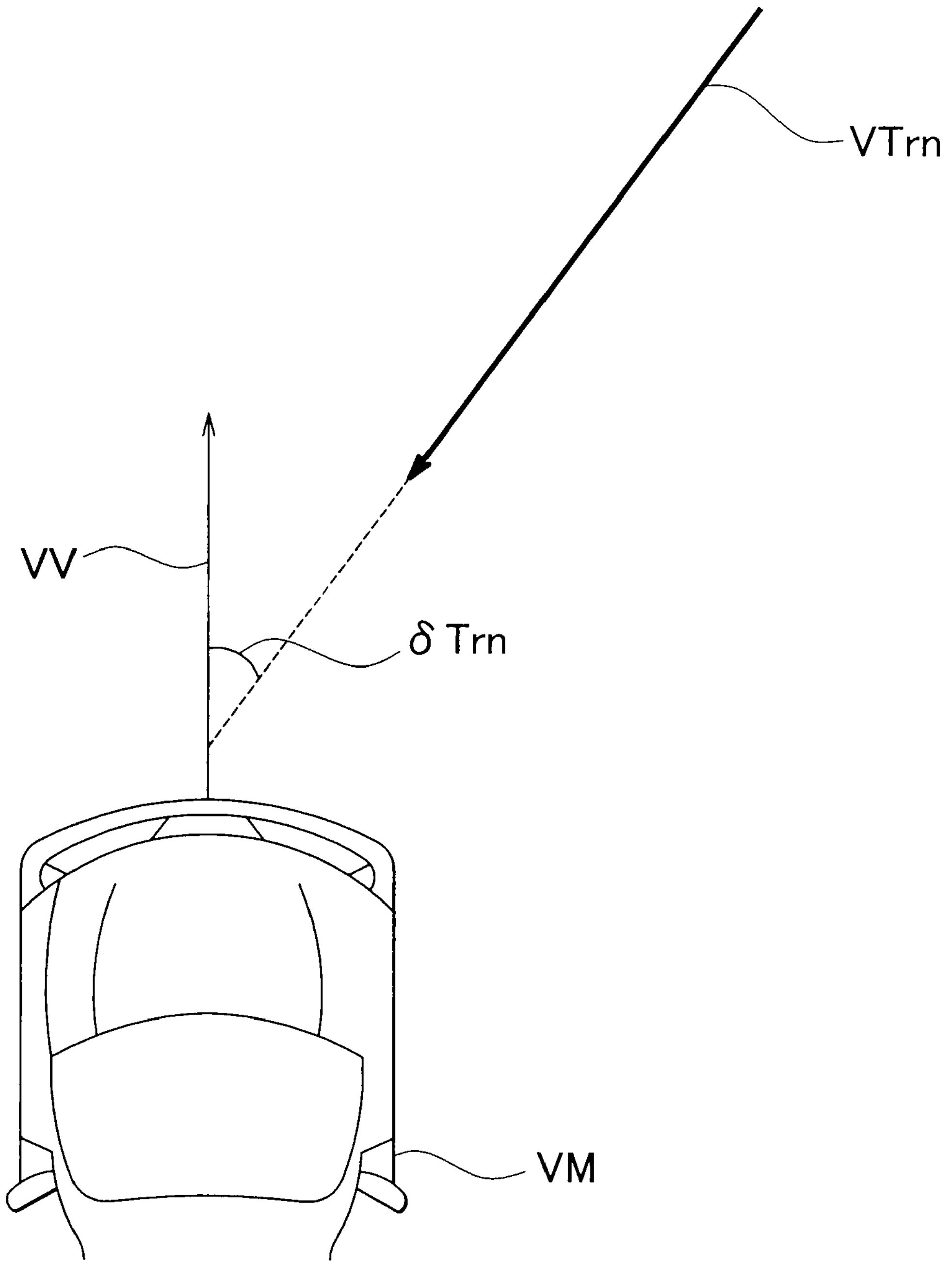
FIG. 10 is a diagram showing a relation between the traveling direction of the host vehicle and an estimated traveling direction of a target represented by target No. Trn in accordance with the embodiment of the invention.

In step S513, the traveling direction prediction portion 22 calculates a traveling direction angle δTrn. Hereinafter, the traveling direction angle δTrn will be described with reference to FIG. 10. FIG. 10 is a diagram showing a relation between the estimated traveling direction VTrn of a target represented by target No. Trn and the traveling direction VV of the host vehicle VM. As shown in FIG. 10, the traveling direction angle δTrn is an angle formed between the traveling direction VV of the host vehicle VM and a straight line that extends as indicated by an arrow in the estimated traveling direction VTr in a fixed ground coordinate system whose origin is an arbitrary position. That is, for example, in the case where the traveling direction angle δTrn is 30°, the target represented by target No. Trn, when seen from the host vehicle VM, travels from a front right side toward the host vehicle VM. Incidentally, the traveling direction angle δTrn is 0° in the case where the estimated traveling direction VTrn of the target represented by target No. Trn and the traveling direction VV of the host vehicle VM are parallel but opposite in direction to each other.

Besides, the traveling direction VV of the host vehicle VM is calculated by the traveling direction prediction portion 22 on the basis of information from a sensor provided in the host vehicle VM, or the like. For example, the traveling direction prediction portion 22 uses information from a vehicle speed sensor, a yaw rate sensor, a lateral acceleration sensor, etc., that are mounted in the host vehicle VM to calculate a direction in which the host vehicle VM is expected to travel, that is, a predicted traveling direction VV of the host vehicle VM.

Referring back to FIG. 5, the traveling direction prediction portion 22, after calculating the traveling direction angle δTrn (in step S513), proceeds to step S514. Incidentally, the traveling direction prediction portion 22 temporarily stores information that shows the traveling direction angle δTrn calculated in step S513, into the target information storage portion 25.

In step S514, the traveling direction prediction portion 22 determines whether or not the temporary variable n has reached a number N of acquired targets. That is, in step S514, the traveling direction prediction portion 22 makes a determination regarding the reliability of the estimated traveling direction VTrn, with respect to each of the targets detected by the right-side radar device 1R (e.g., in the example shown in FIG. 8, the target Nos. are Tr1 to Try, and therefore N=5). Then, if an affirmative determination is made (YES in step S513), the traveling direction prediction portion 22 proceeds to step S516. On the other hand, if a negative determination is made (NO in step S514), the traveling direction prediction portion 22 adds 1 to the temporary variable n (step S515), and returns to step S509 so as to repeat the process.

By repeatedly performing the process of step S508 to step S515, the traveling direction prediction portion 22 calculates the estimated traveling direction VTrn, and makes a determination regarding the reliability of the estimated traveling direction VTrn, with respect to each of the targets detected by the right-side radar device 1R. Furthermore, the traveling direction prediction portion 22 calculates a traveling direction angle δTrn of a target whose estimated traveling direction VTrn is determined as being high.

Then, in the process of a flowchart shown in FIG. 6, in step S516, the grouping determination portion 23 sets the temporary variable n at 1, and then proceeds to step S517.

In step S517, the grouping determination portion 23 determines whether or not the reliability of the estimated traveling direction VTrn of the target represented by target No. Trn is high. Concretely, the grouping determination portion 23 determines whether or not the reliability of the estimated traveling direction VTrn is high, with reference to the information stored in the target information storage portion 25 which shows the estimated traveling direction VTrn. Then, if the determination in step S517 is positive (YES in S517), the grouping determination portion 23 proceeds to step S518. On the other hand, if the determination in step S517 is negative (NO in S517), the grouping determination portion 23 proceeds to step S519, in which the grouping determination portion 23 adds 1 to the temporary variable n. After that, the grouping determination portion 23 returns to step S517.

In step S518, the grouping determination portion 23 sets the temporary variable m for use in this flowchart at 1, and then proceeds to step S520.

In step S520, the grouping determination portion 23 determines whether or not the temporary variable n and temporary variable m are equal. Then if the determination in step S520 is affirmative (YES in S520), the grouping determination portion 23 proceeds to step S527. On the other hand, if the determination in step S520 is negative (NO in S520), the grouping determination portion 23 proceeds to step S521.

The case where the determination in step S520 becomes affirmative will be described. In an example of the case, after n=1 is set in step S516 and subsequently an affirmative determination is made in step S517 (that is, it is determined that the reliability of the estimated traveling direction VTr1 is high), the grouping determination portion 23 sets the temporary variable m at 1 in step S518, which immediately follows the affirmative determination in step S517. That is, because the grouping determination portion 23 performs the process of step S520, step S527, step S528, and step S529, the grouping determination portion 23 does not calculates a distance difference between targets represented by one and the same target number in step S521.

In step S521, the grouping determination portion 23 calculates a distance difference from the target represented by target No. Trn and the target represented by target No. Trm. Then, in step S522, the grouping determination portion 23 performs a rotational transform of rotating the foregoing difference by an angle of δTrn. Then, after calculating a distance difference in step S521 and performing a rotational transform in step S522, the grouping determination portion 23 determines in step S523 whether or not the target represented by target No. Trm is within the range of a frame SP. Hereinafter, with reference to FIGS. 11 and 12, the process of step S521, step S522 and step S523 performed by the grouping determination portion 23 will be described on the assumption that, for example, n=1 and m=2.

Figure 11:
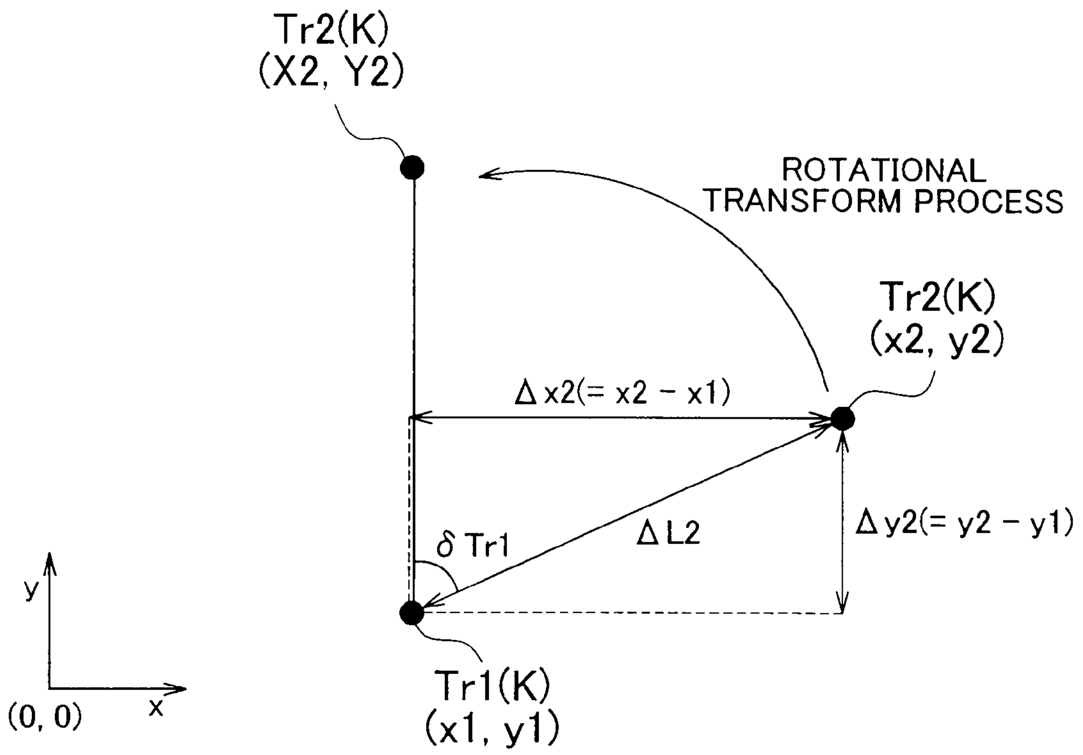
FIG. 11 is a diagram showing a target represented by target No. Tr1 and a target represented by target No. Tr2 in accordance with the embodiment of the invention.

FIG. 11 is a diagram showing a target represented by target No. Tr1, and a target represented by target No. Tr2 in a ground fixed coordinate system whose origin is an arbitrary position. In step S521 and step S522, the grouping determination portion 23 performs a process of rotationally transforming the target represented by target No. Tr2 by an angle δTH about the target represented by target No. Tr1. It is to be noted herein that the pieces of target information ir1 and ir2 used herein are the latest pieces of target information. That is, the position of the target represented by target No. Tr1 in FIG. 11 is shown on the basis of the piece of target information ir1(K), and the position of the target represented by target No. Tr2 in FIG. 11 is shown on the basis of the piece of target information ir2(K).

In a concrete process, the grouping determination portion 23, as shown in FIG. 11, plots the position of the target represented by target No. Tr1 at (x1, y1), and the position of the target represented by target No. Tr2 at (x2, y2) in the ground fixed coordinate system. Then, the grouping determination portion 23 finds a distance difference ΔL2 from the target represented by target No. Tr1 to the target represented by target No. Tr2 in a divided fashion in which the distance difference ΔL2 is resolved into Δx2 and Δy2. That is, Δx2 may be determined as x2-x1, and Δy2 may be determined as y2-y1.

Then, the grouping determination portion 23 calculates the position (X2, Y2) of the target represented by target No. Tr2 after the rotational transform, by substituting Δx2 and Δy2 in the following equations (1) and (2).

$$X2=\Delta x2 \cos \delta Tr1+\Delta y2 \sin \delta Tr1 \quad (1)$$

$$Y2=\Delta x2 \sin \delta Tr1+\Delta y2 \cos \delta Tr1 \quad (2)$$

Incidentally, the angle δTrn used in the rotational transform process is defined with the direction of rotation, and the rotational transform is performed by factoring in the sign of the angle, in order to obtain an angle relative to the host vehicle VM immediately preceding the collision. Concretely, in the case where a target is approaching from the right side of the host vehicle VM (where a target is detected by the right-side radar device 1R), it is assumed that the target is traveling along a right-hand curve, and therefore the rotational transform is performed in the left-hand rotation direction or counterclockwise direction with a negative value of the rotation angle. For example, in the case where the angle δTr1 is 30° in FIG. 11, −30° is substituted in the equations (1) and (2).

Figure 12:
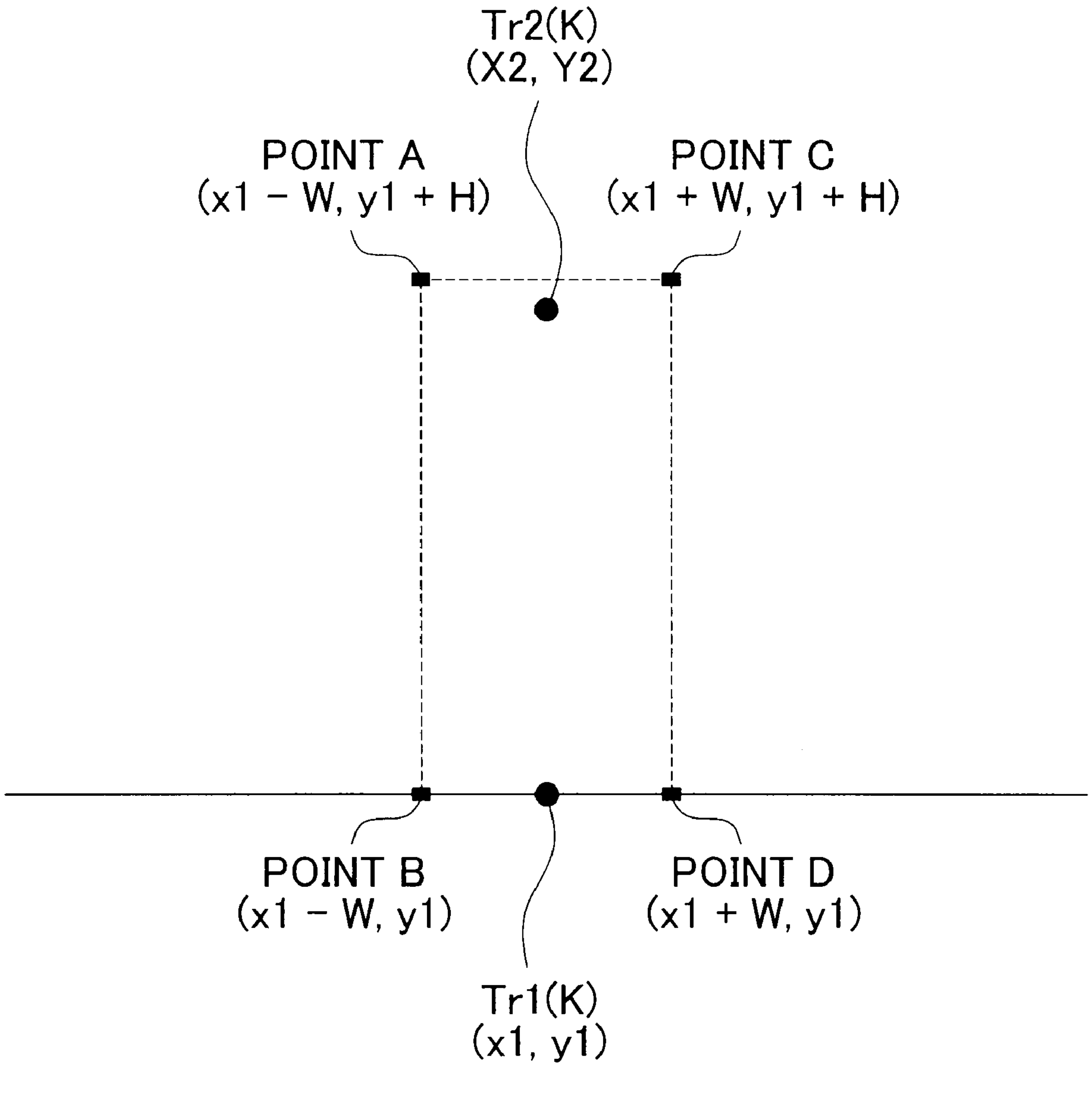
FIG. 12 is a diagram showing a process performed in step S523 in accordance with the embodiment of the invention.

Next, the grouping determination portion 23 determines whether or not the target represented by target No. Trm is within the range of the frame SP (step S523). FIG. 12 is a diagram showing the process performed in step S523. In FIG. 12, an example in which n=1 and m=2, and a target represented by target No. Tr2 has been rotationally transformed with reference to a target represented by target No. Tr1, is assumed, as in FIG. 11. That is, FIG. 12 shows the target represented by target No. Tr2 that has been rotated with reference to the target represented by target No. Tr1. In the process of step S523, the grouping determination portion 23 determines whether or not the target represented by target No. Tr2 obtained through the rotation process is within the range of the frame SP, with reference to the target represented by target No. Tr1. For example, using the grouping range frame shown in FIG. 3 as a reference, a frame SP having a range of a lateral distance W to each of the left and right from the position of the target represented by target No. Tr1 as a reference, and a longitudinal distance H from the position of the target represented by target No. Tr1 as a reference is set. Then, the grouping determination portion 23 applies the frame SP, using the position of the target represented by target No. Tr1 as a reference, as shown in FIG. 12. That is, given the position (x1, y1) of the target represented by target No. Tr1, the range represented by four points, that is, point A(x1−W, y1+H), point B (x1−W, y1), point C (x1+W, y1+H), and point D (x1+W, y1) is set as the frame SP. Then, the grouping determination portion 23 determines whether or not the post-rotation target represented by target No. Tr2 falls within the frame SP (in the example shown in FIG. 12, the post-rotation target represented by target No. Tr2 is within the range of the frame SP). Incidentally, although the frame SP is set with reference to the grouping range frame shown in FIG. 3, the size of the frame SP is not limited so. That is, it suffices to appropriately set the size of the frame beforehand according to the configurations of bodies that are detection subject.

Referring back to FIG. 6, if the grouping determination portion 23 makes an affirmative determination in step S523 (YES), the grouping determination portion 23 proceeds to step S524, in which the grouping determination portion 23 increments the grouping count. On the other hand, if a negative determination is made in step S523 (NO), the grouping determination portion 23 proceeds to step S525.

In step S525, the grouping determination portion 23 determines whether or not the counter value is greater than or equal to a threshold value. If the determination in step S525 is positive (YES), the grouping determination portion 23 proceeds to step S526, in which the grouping determination portion 23 certainly determines the grouping. On the other hand, if the determination in step S525 is negative (NO), the grouping determination portion 23 proceeds to step S527.

In step S527, the grouping determination portion 23 determines whether or not the temporary variable m has reached the number (N number) of targets acquired by the right-side radar device 1R. Then, if the determination in step S527 is negative (NO), the grouping determination portion 23 adds 1 to m in step S528, and returns to step S520. On the other hand, if the determination in step S527 is affirmative (YES), the grouping determination portion 23 proceeds to step S529 in FIG. 7.

In step S529, the grouping determination portion 23 determines whether or not the temporary variable n has reached the number (N number) of targets that the right-side radar device 1R has acquired. Then, if the determination in step S529 is negative (NO), the grouping determination portion 23 adds 1 to n in step S519, and returns to step S517. On the other hand, if the determination in step S529 is affirmative (YES), the grouping determination portion 23 proceeds to step S530.

In this manner, by performing the processes of step S520, step S527, step S528, and step S529, the grouping determination portion 23 is able to perform the calculation of a distance difference and the rotational transform serially with respect to every two of all the targets whose estimated traveling directions have been determined as being high in reliability, and to determine whether or not the two targets concerned are within the range of the frame SP.

Furthermore, by performing the process of step S524 to step S526, the grouping determination portion 23 handles as an object of grouping the targets that fall within the same range (within the frame SP) if the number of the targets therein is greater than or equal to a predetermined number. The process of step S524 to step S526 performed by the grouping determination portion 23 will be more specifically described with reference to FIG. 13.

Figure 13:
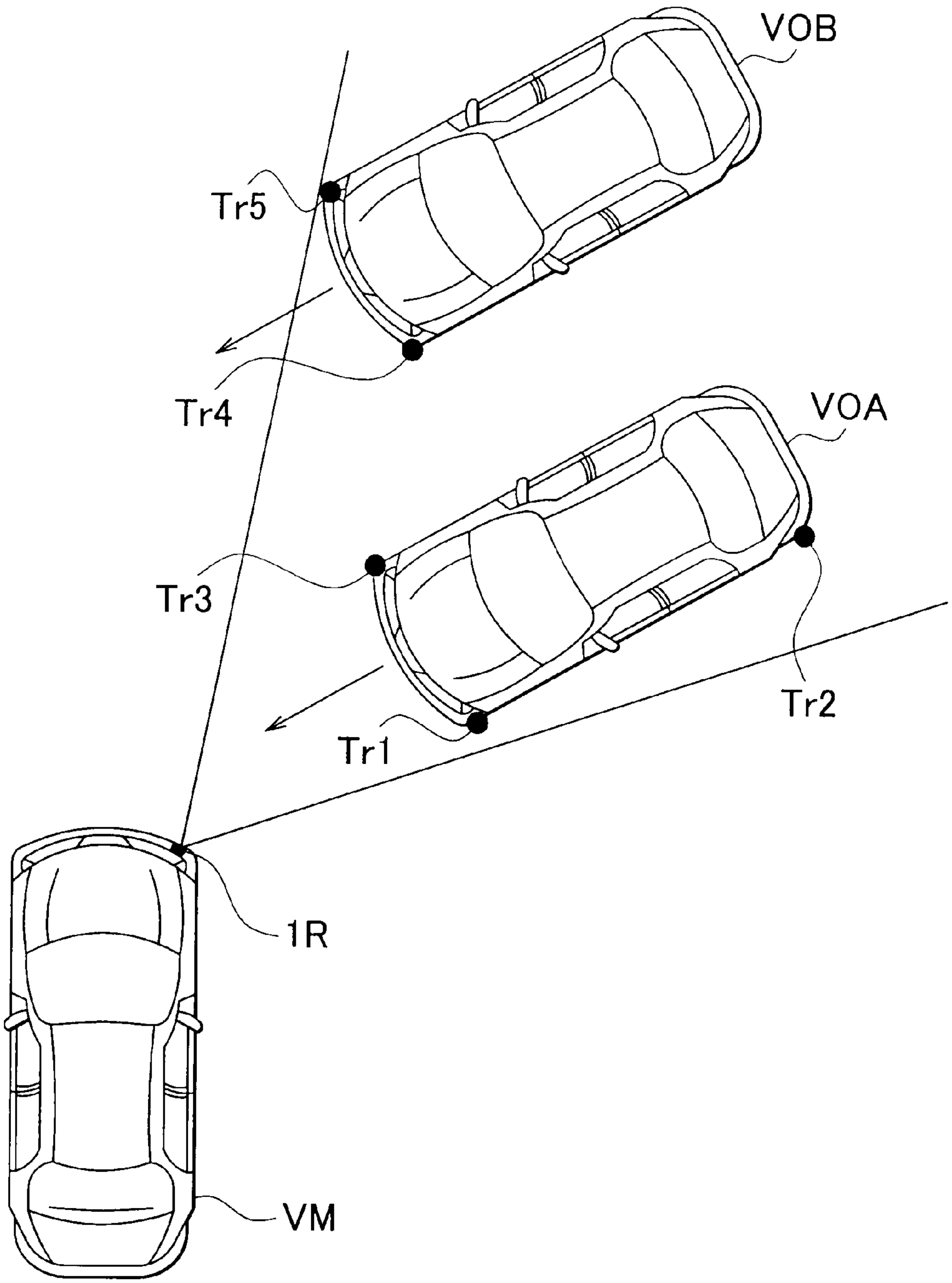
FIG. 13 is a diagram showing a case where the right-side radar device in accordance with the embodiment of the invention has obtained a total of five acquisition points from two vehicles (non-host vehicles)
Figure 14:
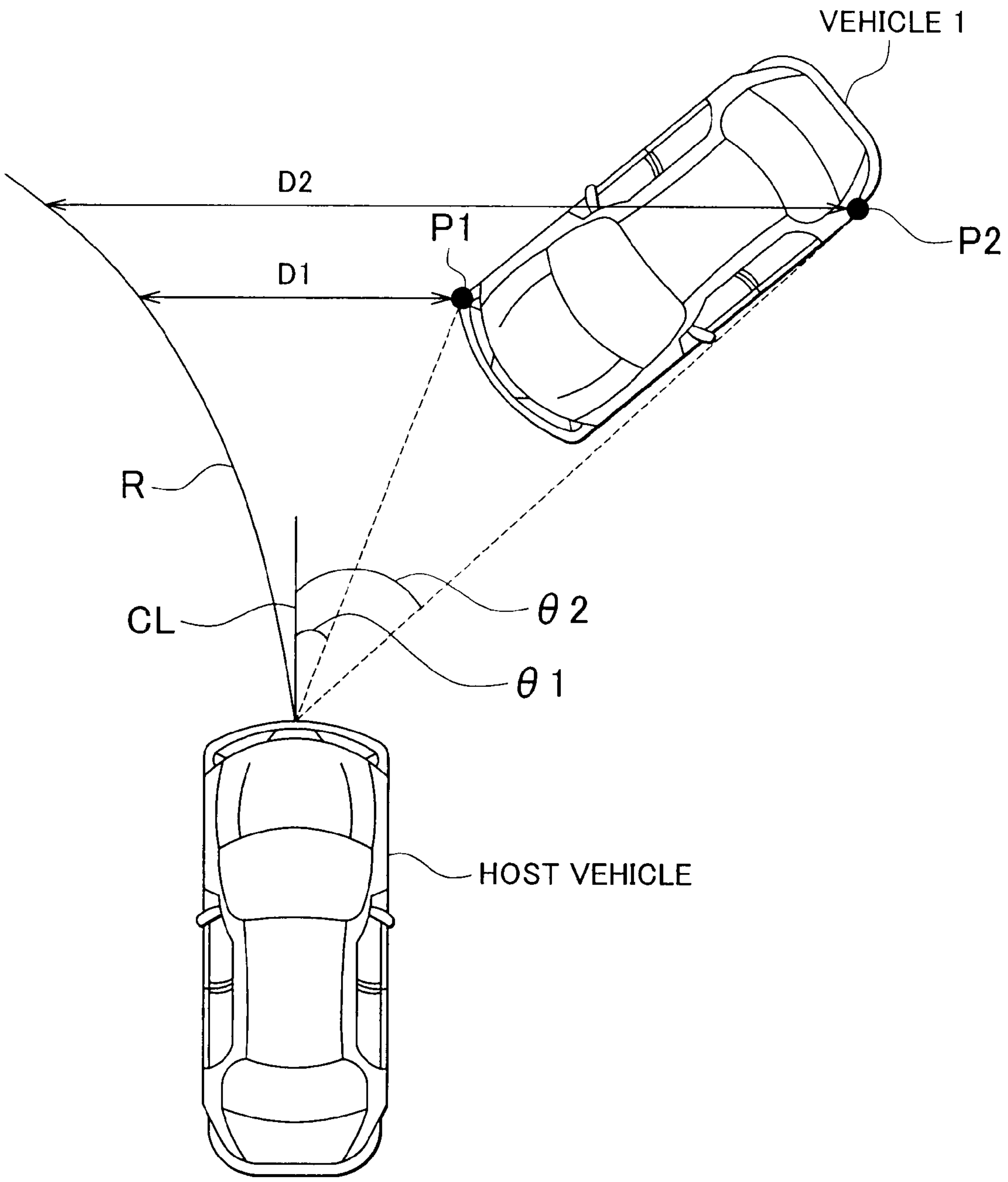
FIG. 14 RELATED ART
FIG. 14 is a diagram for describing a technique that is disclosed in a related art.
Figure 15:
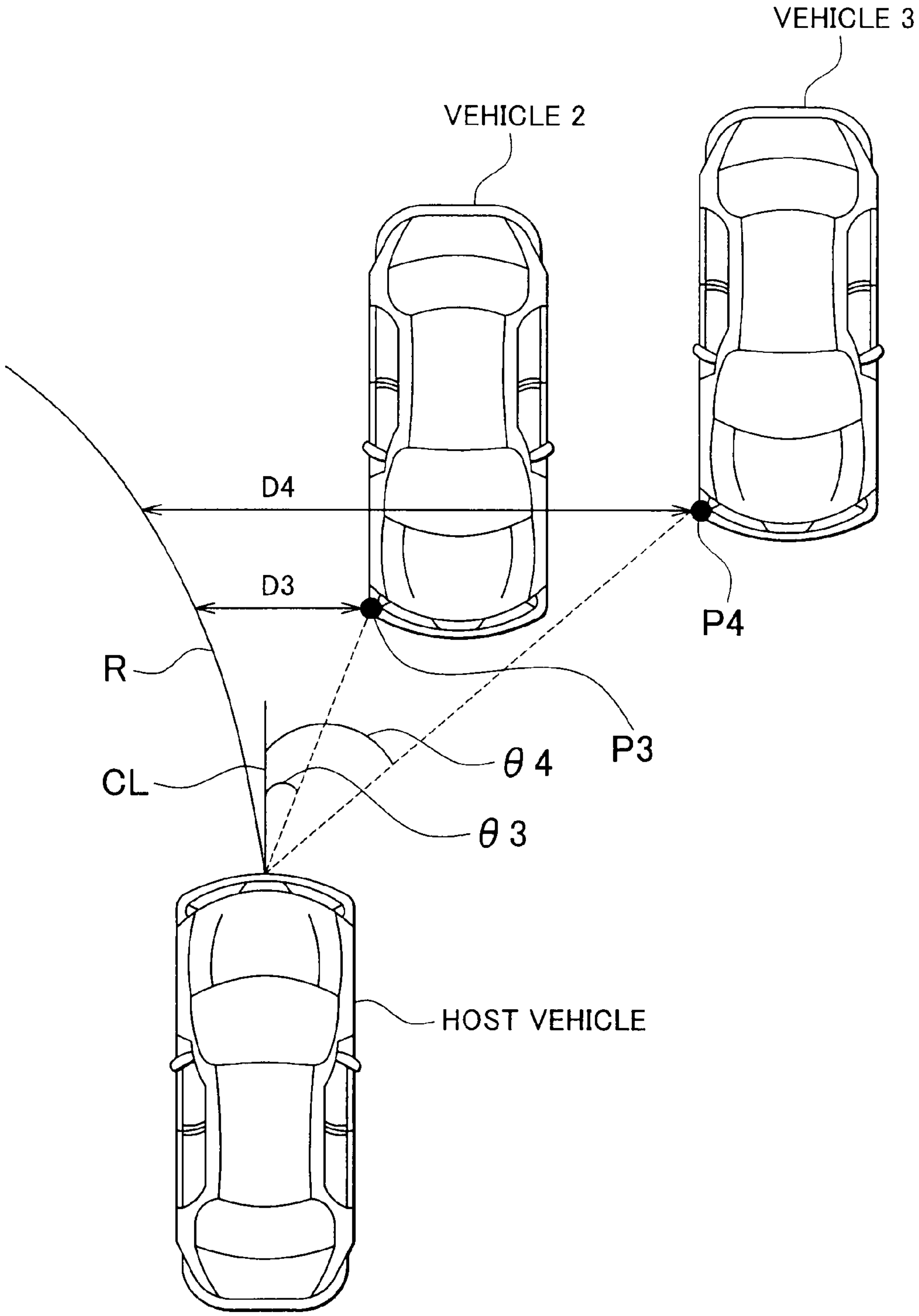
FIG. 15 RELATED ART
FIG. 15 is a diagram for describing a technique that is disclosed in a related art.

For example, it is assumed that the right-side radar device 1R has obtained five acquisition points from a vehicle VOA and a vehicle VOB as shown in FIG. 13. That is, the right-side radar device 1R as shown in FIG. 8 has detected five targets. Then, for the detected targets, the target processing portion 21 sets, for example, target Nos. Tr1 to Tr5.

Then, the traveling direction prediction portion 22 predicts a traveling direction VTrn of each of the targets represented by target Nos. Tr1 to Tr5. Furthermore, the traveling direction prediction portion 22 calculates a traveling direction angle δTrn of each target on the basis of the predicted traveling direction VTrn thereof. Incidentally, in the following description it is assumed that all the predicted traveling directions VTr1 to VTr5 of the targets represented by target Nos. Tr1 to Tr5 have high reliability.

The grouping determination portion 23, by performing the process of step S518 to step S529, performs the calculation of a distance difference and the rotational transform serially with respect to every two of the targets, and determines whether or not the two target concerned are within the range of the frame SP. For example, in the case where the grouping determination portion 23 rotationally transforms the targets represented by target No. Tr2 and target No. Tr3, using the target represented by target No. Tr1 as a reference, and determines, separately for each transformed targets, whether or not the target is within the range of the frame SP, it is considered that each target is within the range of the frame SP. At this time, the counter of the target represented by target No. Tr2 and the counter of the target represented by target No. Tr3 are each incremented. By repeatedly performing this process according to the flowchart, the targets represented by target No. Tr2 and target No. Tr3 are grouped together through the use of the target represented by target No. 1 as a reference, if the value of the counter of the target represented by target No. Tr2, and the value of the counter of the target represented by target No. Tr3 are each greater than or equal to the threshold value.

On the other hand, if the targets represented by target No. Tr1 and target No. Tr3 are rotationally transformed, with the target represented by target No. Tr2 being used as a reference, it is considered that the transformed targets will be outside the range of the frame SP. That is, for example, in the case where the distance difference ΔL1 ($\Delta x1 = x1 - x2$, $\Delta y1 = y1 - y2$) from the target represented by target No. Tr2 to the target represented by target No. Tr1 is calculated, the value of the distance difference ΔL1 is calculated as a negative value, so that if the frame SP as illustrated in FIG. 12 is applied, the target represented by target No. Tr1 will be outside the frame SP. Therefore, the targets represented by target No. Tr1 and target NO. Tr3 are not grouped together, with the target represented by target No. Tr2 being used as a reference. In other words, a target that is near the host vehicle VM may be used as a reference for the grouping (i.e., a representative target).

Likewise, if the target represented by target No. Tr5 is rotationally transformed with the target represented by target No. Tr4 being used as a reference, the target represented by target No. Tr5 is considered to be inside the range of the frame SP, that is, the target represented by target No. Tr5 is grouped together with the target represented by target No. Tr4. That is, the targets represented by target Nos. Tr4 and Tr5 are certainly determined as being in the same group, with the target represented by target No. Tr4 being the representative target.

This manner of processing may prevent, for example, an incident as shown in FIG. 13 in which the right-side radar device 1R obtains acquisition points from a plurality of bodies, such as the vehicle VOA and the vehicle VOB, the acquisition points are estimated to be on one and the same body.

Referring back to FIG. 7, in step S530, the grouping determination portion 23 erases history. Concretely, the grouping determination portion 23 sets the counter whose value is greater than or equal to the threshold value, to a counter value of zero. Besides, the grouping determination portion 23 sequentially erases pieces of target information irn stored in the target information storage portion 25, starting with a past-time piece of target information irn(k) stored in the target information storage portion 25. For example, j number of past-time pieces of target information irn counted back from the latest piece of target information irn(K) are erased. Then, the grouping determination portion 23 proceeds to step S531.

In step S531, the grouping determination portion 23 determines whether or not to end the process. For example, the grouping determination portion 23 ends the process when the power supply of the vehicle-controlling ECU 2 turns off (e.g., when the driver performs an operation for ending the execution of the foregoing process, or when the ignition switch of the host vehicle VM is turned off, etc.). On the other hand, if the grouping determination portion 23 determines that the process is to be continued, the grouping determination portion 23 returns to step S502, so that the process is repeated.

As for the determination as to whether or not there is possibility of collision of the host vehicle VM with a target detected by the right-side radar device 1R, the collision determination portion 24 may make a determination on the basis of only the representative target of grouped targets, that is, in the example shown in FIG. 13, only the piece of target information ir1(K) of the target represented by target No. Tr1 that is the nearest to the host vehicle VM among the targets on the vehicle VOA, or may also collectively make a determination on the basis of all the pieces of target information about the targets detected by the right-side radar device 1R. Then, if the collision determination portion 24 determines that there is possibility of collision between the host vehicle VM and a target, or the collision may not be avoided, the collision determination portion 24 instructs the safety device 3 to take a safety measure as mentioned above.

Thus, according to the body detection apparatus in accordance with this embodiment, the grouping determination portion 23 of the vehicle-controlling ECU 2 takes into account characteristics of movements of the targets detected by each radar device 1, and appropriately groups targets that are approaching obliquely to the host vehicle VM as well as targets that are coming closer to the host vehicle VM from the front. Therefore, the gargets detected by each radar device 1 may be accurately grouped.

Although the foregoing description has been made with regard to targets detected by the right-side radar device 1R, it is to be understood that the embodiment is also applicable to the case where the left-side radar device 1L detects targets. In this case, the target processing portion 21 sets target Nos. Tln for targets that the left-side radar device 1L has detected, and generates target information iln. Then, the traveling direction prediction portion 22 calculates an estimated traveling direction VTln of each of the targets detected by the left-side radar device 1L, and makes a determination regarding the reliability of the estimated traveling direction VTln of each target. Furthermore, with regard to each target whose estimated traveling direction VTln has been determined as being high in reliability, the traveling direction prediction portion 22 calculates a traveling direction angle δTln. Then, the grouping determination portion 23 performs the calculation of a distance difference and the rotational transform serially with respect to every two of all the targets whose estimated traveling directions have been determined as being high in reliably, and determines whether or not the two targets concerned are within the range of the frame SP.

Incidentally, as for the rotational transform process, in the case where a target is approaching from the left side of the host vehicle VM (where a target is detected by the left-side radar device 1L), the target is assumed to be traveling along a left-hand curve, and the rotational transform is performed in the right-hand rotation direction or clockwise direction with a positive value of rotation angle. For example, in the case where the left-side radar device 1L detects a target, and a traveling direction of the detected target is predicted, and the traveling direction angle δTln thereof is calculated as 30° (the case where the target is traveling toward the host vehicle VM from forward left when seen from the host vehicle VM), 30° is substituted in the equation (1) and the equation (2).

Besides, if, for example, an image processing device, is mounted in the host vehicle VM in addition to the foregoing body detection apparatus, it is then conceivable to appropriately change the length H and the width W of the frame SP according to the size of bodies that are to be detected by each radar device 1. Concretely, for example, an image processing device that includes a camera or the like that is capable of taking images of surroundings forward of the host vehicle VM is mounted in the host vehicle VM. Then, by processing images taken by the camera, the size of a body existing in a neighboring area forward of the host vehicle VM is estimated. For example, in the case where the image processing device estimates that a body that is longer than a typical automobile is present in the neighboring area forward of the host vehicle VM, the length H of the frame SP may be set to the length of that large-size vehicle (bus or the like). If the body detection apparatus performs processing by using results of estimation by the image processing device, it is considered possible to prevent the false grouping of a plurality of automobiles that are running on an adjacent lane due to the increased size of the frame SP, for example.

Incidentally, if the direction or orientation of a body present in a neighboring area forward of the host vehicle VM may be accurately determined by the image processing device, the body detection apparatus may calculate the traveling direction angle on the basis of the determined orientation of the body.

The constructions, manners, etc. described above in conjunction with the embodiment of the invention are merely to show concrete examples, and do not limit at all the technical scope of the claimed invention. Therefore, it is possible to adopt an arbitrary construction within the range that achieves the effects of the invention described in this application.

According to the foregoing construction, a plurality of targets detected by the radar device may be grouped on the basis of characteristics of movement of the targets, and characteristics of movement of the host vehicle. Therefore, the bodies detected by the radar device may be accurately grouped, so that acquisition points obtained from one and the same body may be appropriately determined as being acquisition points of the same body.

According to the foregoing construction, since the shape of the frame is rectangular and the longitudinal direction of the rectangular frame is set as the reference traveling direction, the frame may be made suitable to bodies (passenger automobiles, large-side vehicles, busses, etc.) that the vehicle-mounted radar device handles as detection objects.

According to the foregoing construction, even when the radar device detects a plurality of targets, the grouping thereof may be appropriately performed.

According to the foregoing construction, the grouping process may be performed, using a target that is the nearest to the host vehicle as a representative target.

According to the foregoing construction, the movement direction calculation portion is able to use a time-sequential history of movement directions, so that when the movement direction at the present time point is to be calculated, for example, a least squares method or the like, may be utilized.

According to the foregoing construction, the determination portion is able to make a determination regarding reliability of acquisition points.

According to the foregoing construction, the determination portion is able to more certainly make a determination that the acquisition points within the frame are acquisition points of a single body.

According to the foregoing construction, determination regarding collision is performed by using one acquisition point among the acquisition points determined as being acquisition points of a single body. Therefore, the load of the process that the collision determination portion performs may be reduced.

According to the foregoing construction, the size of the frame may be caused to correspond to an assumed environment (actual road) of use of the radar device.

The body detection apparatus and the body detection method according to the invention are useful for vehicle-mounted radar devices and the like, and are capable of accurately grouping the bodies detected by such a radar device.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A body detection apparatus that is mounted in a vehicle, and that detects a body around the vehicle, comprising:

movement direction calculation portion that calculates a movement direction of each of acquisition points by using signals that show the acquisition points and that are obtained through detection of a body present around the vehicle; and determination portion that pre-sets a frame commensurate with a shape of a body as a detection object, and for pre-setting for the frame a reference traveling direction as an assumed traveling direction of the body, and for determining, among the acquisition points, acquisition points present within the frame whose reference traveling direction is aligned with the movement direction as being acquisition points of a single body.

2. The body detection apparatus according to claim 1, wherein the frame is a rectangular frame whose shape resembles a shape of a body that is handled as the detection object.

3. The body detection apparatus according to claim 1, wherein a shape of the body is estimated based on a content of processing of an image processing device that is mounted in the vehicle, and the frame is set according to the shape of the body estimated.

4. The body detection apparatus according to claim 2, wherein the determination portion sets a longitudinal direction of the rectangular frame as the reference traveling direction.

5. The body detection apparatus according to claim 1, wherein the determination portion determines acquisition points which are present in the frame and whose movement directions are the same direction, as being acquisition points of the single body.

6. The body detection apparatus according to claim 1, wherein:

the determination portion performs a process of selecting one acquisition point from acquisition points that are obtained by detecting bodies around the vehicle; and among the acquisition points present in the frame whose reference traveling direction has been aligned with the movement direction of the selected acquisition point, the determination portion determines acquisition points that are present more remote from the vehicle than the selected acquisition point is from the vehicle, as being acquisition points of the single body.

7. The body detection apparatus according to claim 1, wherein the movement direction calculation portion calculates a present-time movement direction of each of the acquisition points by computing a history of the movement directions of the acquisition points in a time sequence fashion through a predetermined function.

8. The body detection apparatus according to claim 1, wherein:

the movement direction calculation portion also calculates a moving speed of each of the acquisition points; and the determination portion handles an acquisition point as an object of determination in conjunction with the single body, if the moving speed of the acquisition point is greater than or equal to a threshold value, and in the history of the acquisition point, proportion of a history in which strength of a signal by which the acquisition point is obtained is greater than or equal to a predetermined strength is greater than or equal to a threshold value.

9. The body detection apparatus according to claim 1, wherein the determination portion certainly determines acquisition points present in the frame as being acquisition points on the single object if a number of times of determination that the acquisition points are present in the frame reaches a predetermined number of times.

10. The body detection apparatus according to claim 1, further comprising collision determination portion that determines, by using at least one of a plurality of acquisition points that are determined as being acquisition points of the single body, whether or not the vehicle is to collide with the body.

11. The body detection apparatus according to claim 10, wherein the collision determination portion determines whether or not the vehicle is to collide with the body, by using an acquisition point that is nearest to the vehicle, among the acquisition points that have been determined as being acquisition points of the single body.

12. The body detection apparatus according to claim 4, wherein the determination portion sets a length of the rectangular frame in a longer-dimension direction, and a width of the rectangular frame in a shorter-dimension direction, according to a length and a width of a motor vehicle, respectively.

13. The body detection apparatus according to claim 1, wherein the movement direction calculation portion predicts a traveling direction of each of the acquisition points.

14. The body detection apparatus according to claim 13, wherein the movement direction calculation portion calculates reliability of the traveling direction of each acquisition point that is predicted on the basis of amount of information about the acquisition point used in predicting the traveling direction of the acquisition point, and movement distance of the acquisition point.

15. A body detection method that is installed in a vehicle and that detects a body around a vehicle, comprising:

calculating a movement direction of each of acquisition points by using signals that show the acquisition points and that are obtained through detection of a body present around the vehicle; and pre-setting a frame commensurate with a shape of a body that is handled as a detection object, and pre-setting for the frame a reference traveling direction as a traveling direction assumed on the body, and determining, among the acquisition points, acquisition points present within the frame whose reference traveling direction is aligned with the movement direction, as being acquisition points of a single body.

* * * * *